(12) United States Patent
Kobayashi et al.

(10) Patent No.: US 9,342,234 B2
(45) Date of Patent: May 17, 2016

(54) SYSTEM AND METHOD FOR MOBILE INFORMATION DEVICE CONTENT DISPLAY AND SELECTION WITH CONCURRENT POP-UP EXPLANATORY INFORMATION

(75) Inventors: Ikuo Kobayashi, Kanagawa (JP); Masaki Takahashi, Kanagawa (JP); Shuji Hiramatsu, Tokyo (JP); Toru Yamamoto, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 85 days.

(21) Appl. No.: 13/611,132

(22) Filed: Sep. 12, 2012

(65) Prior Publication Data

US 2013/0132876 A1    May 23, 2013

(30) Foreign Application Priority Data

Nov. 21, 2011    (JP) .................................. 2011-254266

(51) Int. Cl.
*G06F 3/048* (2013.01)
*G06F 3/0488* (2013.01)
*G06F 3/0486* (2013.01)

(52) U.S. Cl.
CPC ............ *G06F 3/0488* (2013.01); *G06F 3/0486* (2013.01)

(58) Field of Classification Search
CPC ..... G06F 9/4443; G06F 9/543; G06F 3/0486; G06F 3/0488; G06F 3/048
USPC .......................................... 715/711, 802, 769
See application file for complete search history.

(56) References Cited

U.S. PATENT DOCUMENTS

| 6,141,003 | A | 10/2000 | Chor |
| 6,583,801 | B2 | 6/2003 | Eastty |
| 7,395,547 | B2 * | 7/2008 | Hammett et al. ................ 725/34 |
| 7,434,170 | B2 * | 10/2008 | Novak et al. ................... 715/764 |

(Continued)

FOREIGN PATENT DOCUMENTS

| JP | 11032272 A | 2/1999 |
| JP | 11282597 A | 10/1999 |

(Continued)

OTHER PUBLICATIONS

European Search Report for corresponding EP Application No. 12007534.6, dated Mar. 27, 2013.

(Continued)

*Primary Examiner* — Jennifer To
*Assistant Examiner* — Hugo Molina
(74) *Attorney, Agent, or Firm* — Matthew B. Dernier, Esq.

(57) ABSTRACT

A user screen display control unit displays not only a content selected by the user but also places a plurality of icons, with which to select a content to be displayed, adjacent to each other and displays the plurality of icons. When a drag operation over the plurality of icons is detected by an operation detector, the user screen display control unit displays the caption for a selected icon in a forefront manner and switches the caption for each icon sequentially selected by a drag operation and sequentially displays the caption. When a predetermined operation is detected on an icon located in a position where the drag operation ends, the user screen display control unit switches the content displayed on the display device to a content associated with the icon located in the position where the drag operation ends.

10 Claims, 15 Drawing Sheets

(56) References Cited

U.S. PATENT DOCUMENTS

| | | | |
|---|---|---|---|
| 7,778,973 B2* | 8/2010 | Choi et al. | 707/628 |
| 7,925,306 B2* | 4/2011 | Carmody et al. | 455/566 |
| 8,169,405 B2* | 5/2012 | Hunleth et al. | 345/158 |
| 8,259,136 B2* | 9/2012 | Kim et al. | 345/660 |
| 8,291,349 B1* | 10/2012 | Park et al. | 715/863 |
| 8,661,369 B2* | 2/2014 | Heo et al. | 715/864 |
| 9,128,597 B2 | 9/2015 | Bamford | |
| 2002/0126156 A1 | 9/2002 | Eastty | |
| 2002/0163545 A1* | 11/2002 | Hii | 345/838 |
| 2004/0085364 A1 | 5/2004 | Keely | |
| 2005/0071761 A1 | 3/2005 | Kontio | |
| 2005/0091596 A1* | 4/2005 | Anthony et al. | 715/712 |
| 2006/0184966 A1* | 8/2006 | Hunleth et al. | 725/39 |
| 2006/0236349 A1* | 10/2006 | Lee | 725/80 |
| 2007/0204232 A1* | 8/2007 | Ray et al. | 715/738 |
| 2008/0171535 A1* | 7/2008 | Carmody | H04M 1/72552 455/412.2 |
| 2008/0222558 A1* | 9/2008 | Cho et al. | 715/784 |
| 2008/0307363 A1* | 12/2008 | Jalon et al. | 715/835 |
| 2009/0049123 A1* | 2/2009 | Dargahi et al. | 709/203 |
| 2009/0106674 A1* | 4/2009 | Bray | G06F 17/30112 715/762 |
| 2010/0095239 A1* | 4/2010 | McCommons et al. | 715/784 |
| 2010/0162153 A1* | 6/2010 | Lau | 715/769 |
| 2010/0287508 A1* | 11/2010 | Kim | G06F 17/30023 715/835 |
| 2011/0167369 A1* | 7/2011 | van Os | 715/769 |
| 2011/0197129 A1* | 8/2011 | Hsu | G06F 9/4443 715/716 |
| 2011/0225539 A1* | 9/2011 | Lee et al. | 715/784 |
| 2012/0066602 A1* | 3/2012 | Chai et al. | 715/733 |
| 2012/0084644 A1* | 4/2012 | Robert et al. | 715/255 |
| 2012/0084691 A1* | 4/2012 | Yun | 715/769 |
| 2012/0192095 A1 | 7/2012 | Bamford | |

FOREIGN PATENT DOCUMENTS

| | | |
|---|---|---|
| JP | 2009266201 A | 11/2009 |
| JP | 2011054130 A | 3/2011 |

OTHER PUBLICATIONS

Office Action for corresponding JP Application No. 2011-254266, pp. 1-7, dated Oct. 13, 2015.

"How to make carousel panel sliding UI with pagination with jQuery," pp. 1-8, Jul. 8, 2011, BLACKFLAG, <URL:http://black-flag.net/jquery/20110708-3310.html> (for relevancy see Office Action for corresponding JP Application No. 2011-254266, pp. 1-7, dated Oct. 13, 2015).

* cited by examiner

PHOTO SHARING SYSTEM 100

| RECENT POSTINGS | | | | | |
|---|---|---|---|---|---|
| MT. FUJI 1 | MT. FUJI 2 | MT. FUJI 3 | | | |
| A | B | C | D | E | ▲ |
| | | | pic01 | pic02 | |
| F | G | H | I | J | |
| pic03 | | | | | |
| K | L | M | N | O | |
| ... | ... | ... | ... | ... | |

SYSTEM AND METHOD FOR MOBILE INFORMATION DEVICE CONTENT DISPLAY AND SELECTION WITH CONCURRENT POP-UP EXPLANATORY INFORMATION

BACKGROUND OF THE INVENTION

1. Field of the Invention

The present invention relates to a data processing technology, and more particularly to mobile information devices and a content display method therefor.

2. Description of the Related Art

There are community websites providing a service in which photographs are posted by site users and thus shared by a plurality of users (hereinafter referred to as "photo sharing site"). By accessing a photo sharing site, the users can browse the photographs having been shot by the other users and post their comments or the like on the photos they have browsed.

Mobile information devices combining a display and a touch panel are now in wide-spread use. Generally, the display size of mobile information devices is smaller than that of stationary information processing devices. However, when an electronic content, such as a photograph, is to be displayed on a mobile information device, it is necessary to provide a content display area of an adequate size to facilitate the recognition of the content by the user. Hence, when an icon to accept user operation is to be displayed together with the content on the display screen of the mobile information device, the display size of the icon is subject to limitation, thus rendering the icon less operable.

SUMMARY OF THE INVENTION

The present invention has been made in view of the foregoing circumstances, and the main purpose thereof is to provide a technology to maintain the operability of an icon displayed together with an electronic content on a mobile information device.

In order to resolve the aforementioned problems, a mobile information device according to one embodiment of the present invention includes: a first display control unit configured to display data of a content item, selected by a user, in a first region of a screen; a second display control unit configured to adjacently arrange a plurality of icons through which the user selects the content item displayed in the first region, and configured to display the plurality of icons in a second region of the screen; an operation detector configured to detect a selection operation, performed by the user, for an icon displayed in the second region; and a pop-up display control unit configured to display, in a forefront manner, information on the selected icon in a third region of the screen when the selection operation is detected. The operation detector detects, as the selection operation, a drag operation by the user over the plurality of icons displayed in the second region; the pop-up display control unit sequentially switches among information on the plurality of icons selected sequentially by the drag operation so as to be displayed sequentially in the third region; and when a predetermined operation is detected for an icon located in a position where the drag operation ends, the first display control unit switches the content item displayed in the first region to a content item associated with the icon located in the position where the drag operation ends.

Another embodiment of the present invention relates to a content display method. This method is one executed by a mobile information device, and the method includes: displaying a content item to be selected by a user on a screen, adjacently arranging a plurality of icons through which the user selects the content item to be displayed, and displaying the plurality of icons on the screen; switching among information on the plurality of icons selected sequentially by a drag operation so as to display the information sequentially on a predetermined region of the screen when the drag operation is detected over the plurality of icons; and switching the content item displayed on the screen to a content item associated with an icon located in a position where the drag operation ends when a predetermined operation is detected on said icon located in the position where the drag operation ends.

Optional combinations of the aforementioned constituting elements, and implementations of the invention in the form of apparatuses, methods, systems, computer programs, recording media that store the programs, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
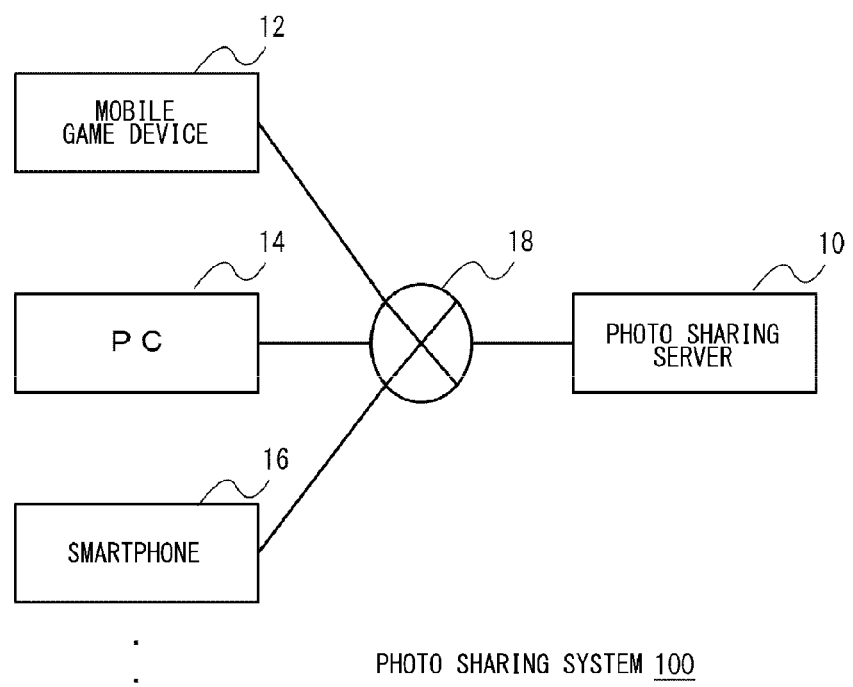
FIG. 1 illustrates a structure of a photo sharing system according to an embodiment of the present invention.

FIG. 1 shows a structure of a photo sharing system 100 according to an embodiment of the present invention. The photo sharing system 100 includes a photo sharing server 10, a mobile game device 12, a personal computer (PC) 14, and a smartphone 16. These component units are interconnected with each other via a communication network 18, such as LAN (Local Area Network, WAN (Wide Area Network), the Internet, and the like.

The photo sharing server 10 is a server for providing services of a photo sharing site. The photo sharing server 10 manages photographs uploaded from client devices, such as mobile game devices 12, PCs 14, and smartphones 16, and information on the users of those devices. And the photo sharing server 10 delivers electronic contents including those photographs and information in response to the requests from those client devices. The photo sharing server 10, which has typically the functions of a web server, sends and receives data by the HTTP (HyperText Transfer Protocol) communication to and from the client devices.

Hereinbelow, a detailed description will be given of a mobile game device 12 running on an application software providing client functions for a photo sharing site, that is, a photo viewing application supporting ready viewing of an electronic content offered by the photo sharing server 10. Note, however, that the photo viewing application is not limited to the use with the mobile game device 12, but it is widely applicable to various mobile information devices with touch panel, such as mobile phones, smartphones, tablet terminals, personal digital assistants (PDAs), and the like.

Figure 2:
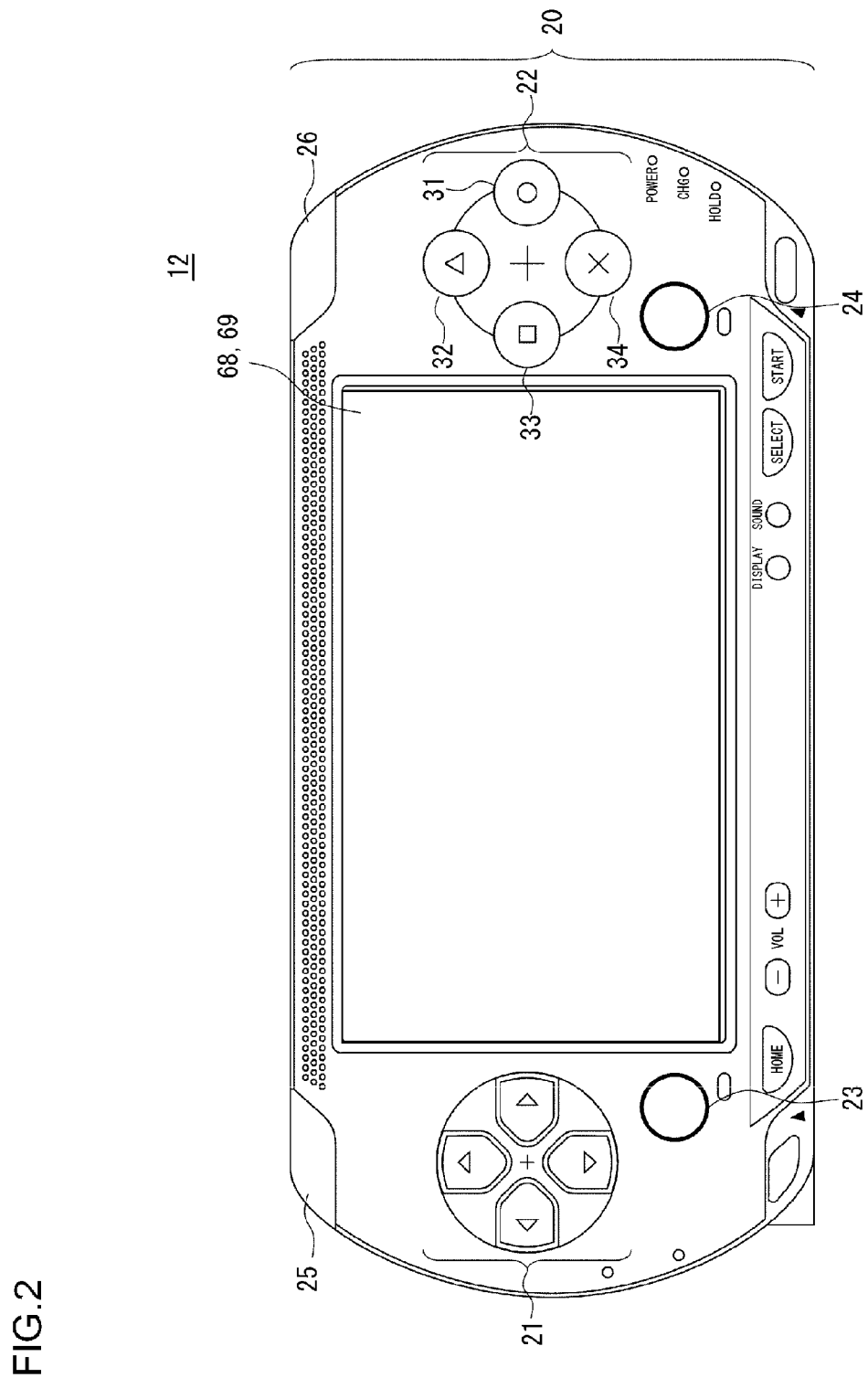
FIG. 2 illustrates an appearance of a mobile game device.

FIG. 2 illustrates an appearance of a mobile game device 12. The mobile game device 12 is provided with input devices 20, such as a direction key 21, buttons 22, a left analog stick 23, a right analog stick 24, a left button 25, and a right button 26, and a display device 68. The display device 68 is also provided with a touch panel 69 that detects contact by a finger of the user. The buttons 22 includes a "○" (circle) button 31, a "Δ" (triangle) button 32, a "□" (square) button 33, and a "×" (cross) button 34. The display device 68 may be a 5-inch organic EL (electroluminescent) display, for instance, and its screen resolution may be 960×544, for instance.

Figure 3:
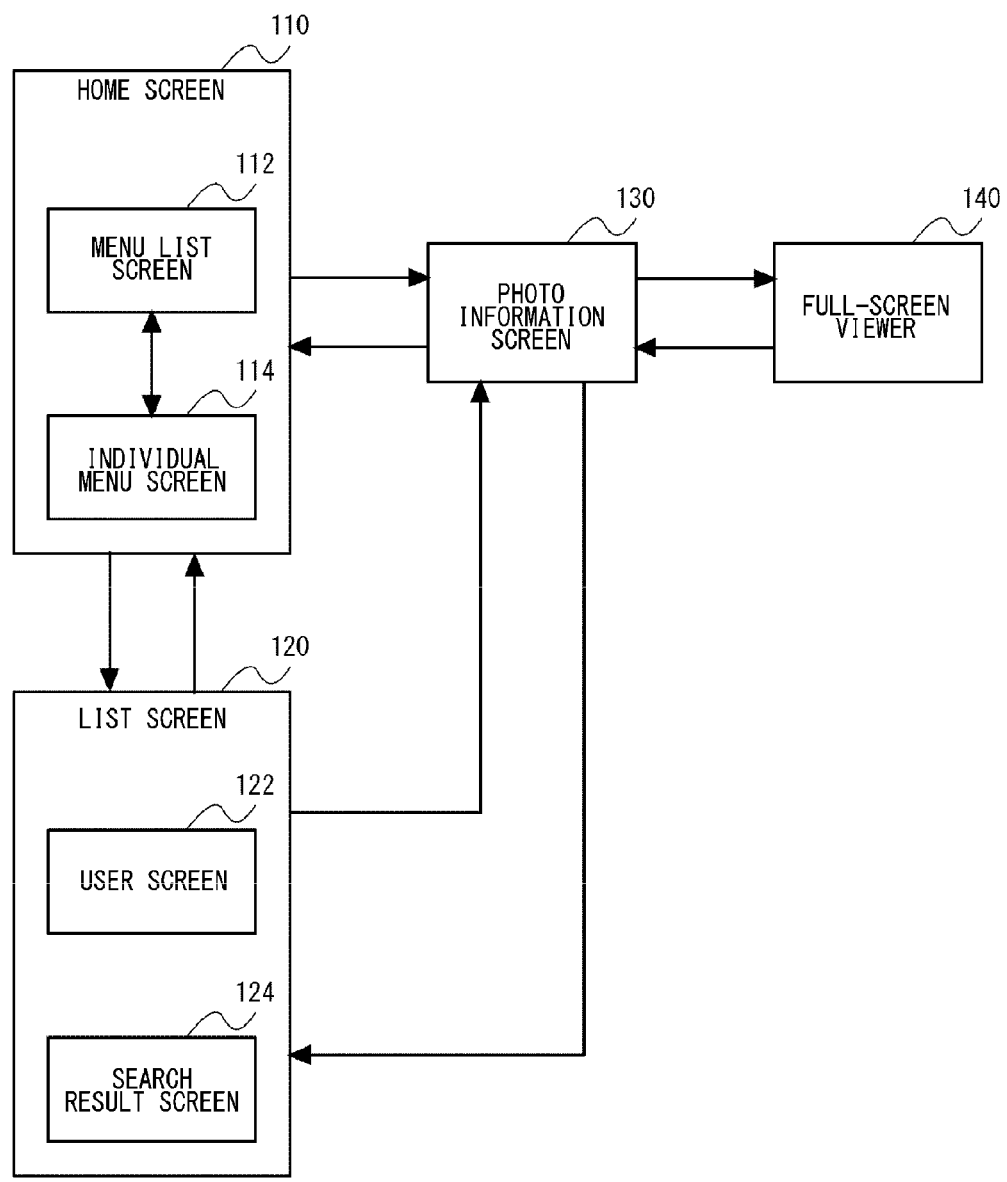
FIG. 3 shows how screens change from one to another on a mobile game device.

FIG. 3 shows how the screens change from one to another on the mobile game device 12. In other words, FIG. 3 is a schematic representation of the interrelationships between multiple kinds of user interfaces on the mobile game device 12 which is now executing a photo viewing application.

A menu list screen 112, which is an initial screen (top screen) to be displayed right after the activation of the photo viewing application, displays a menu list from which a user can make a menu selection. The menu list screen 112 will be described later in connection with FIG. 6. An individual menu screen 114 is a screen displaying a detailed content of a menu when a specific menu has been selected on the menu list screen 112. The individual menu screen 114 will be described later in connection with FIG. 7. Hereinbelow, the menu list screen 112 and the individual menu screen 114 will be collectively referred to as "home screen 110" also.

A user screen 122 is a screen for displaying a content concerning users when a user category menu is selected on the home screen 110 (e.g., when a user category icon is tapped). The user screen 122 will be described later in connection with FIGS. 9 to 14. A search result screen 124 is a screen for displaying the results of a search for a photo sharing site when a search request has been inputted on the home screen 110. Hereinbelow, the user screen 122 and the search result screen 124 will be collectively referred to as "list screen 120" also.

A photo information screen 130 is a screen for displaying detailed information on a photograph when a specific photograph is selected on the home screen 110 or the list screen 120 (e.g., when a specific photo image is tapped). The photo information screen 130 will be described later in connection with FIGS. 15 and 16. A full-screen viewer 140 is a screen for displaying a photograph identified on the photo information screen 130 full-screen on the display device 68.

Figure 4:
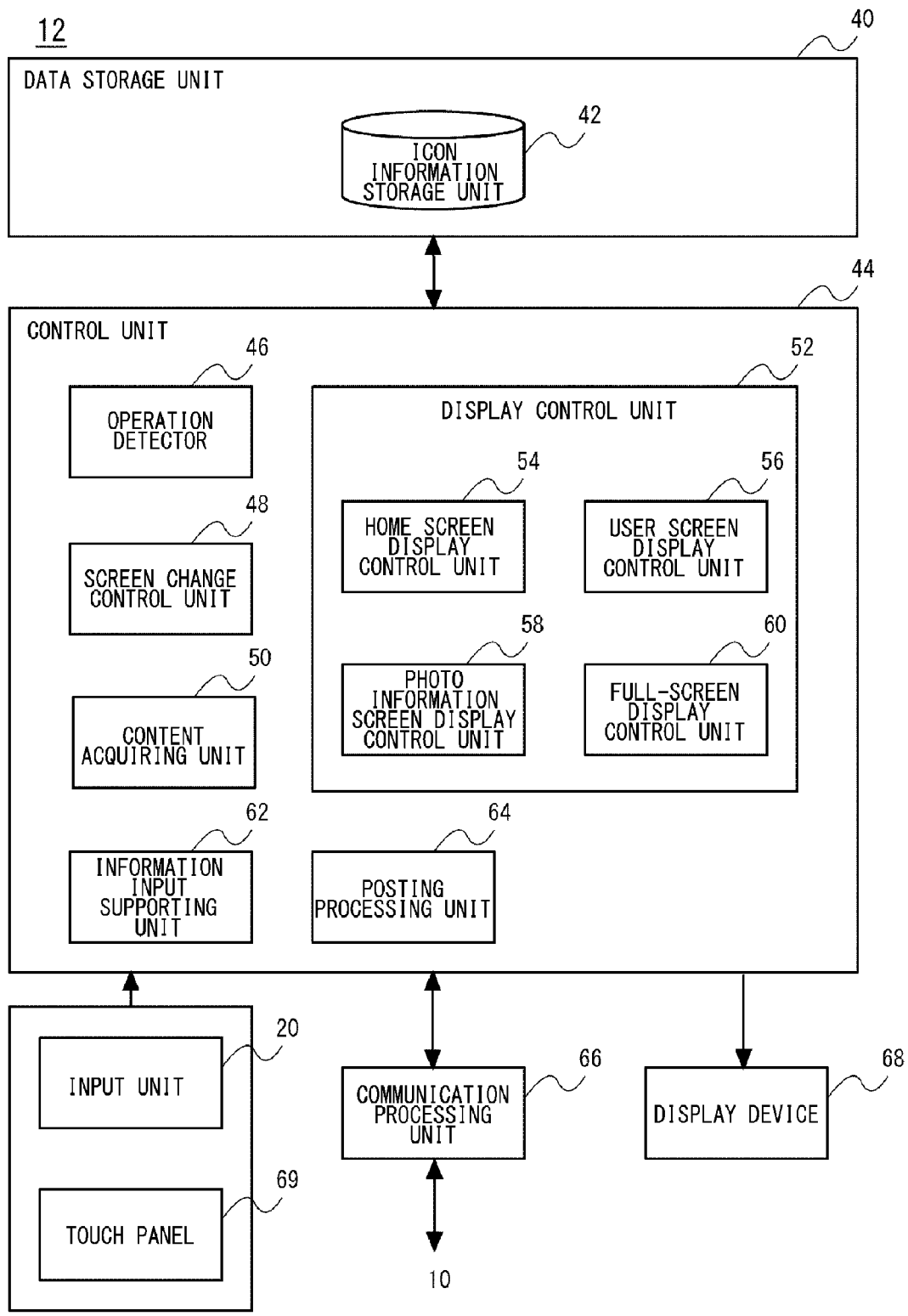
FIG. 4 is a block diagram showing a functional structure of a mobile game device.

FIG. 4 is a block diagram showing a functional structure of the mobile game device 12. The mobile game device 12 includes an input unit 20, a communication processing unit 66, a display device 68, a touch panel 69, a data storage unit 40, and a control unit 44.

Each block shown in the block diagrams of the present patent specification may be achieved hardwarewise by elements and mechanical devices such as a CPU, memory, and the like of a computer, and softwarewise by computer programs and the like. Depicted herein are functional blocks implemented by cooperation of hardware and software. Therefore, it will be obvious to those skilled in the art that the functional blocks may be implemented by a variety of manners including hardware only, software only or a combination of both.

The photo viewing application, for example, may include program modules compatible with the data storage unit 40 and the control unit 44 of FIG. 4. Also, the arrangement may be such that the functions of the respective blocks of the control unit 44 are carried out as the program modules corresponding to the respective blocks stored in a storage, such as flash memory, are read out as appropriate to the main memory for execution by the CPU. Also, the functions of the respective blocks of the data storage unit 40 may be carried out with data stored in a storage such as flash memory or main memory.

The communication processing unit 66 transmits and receives data to and from the photo sharing server 10 via the communication network 18 in response to the requests from a content acquiring unit 50 and a posting processing unit 64 to be described later.

The data storage unit 40, which is a storage area of various data, includes an icon information storage unit 42. The icon information storage unit 42 stores information on a plurality of icons to be displayed on the display device 68, such as icon images, caption (in other words, explanatory text or supplemental information) for icons and display positions (coordinates or the like) of icons, for instance. Note that the data storage unit 40 also stores such contents as photo images and texts acquired from the photo sharing server 10.

The control unit 44 includes an operation detector 46, a screen change control unit 48, a content acquiring unit 50, a display control unit 52, an information input supporting unit 62, and a posting processing unit 64.

The operation detector 46 detects operations by the user on the input unit 20 and the touch panel 69. In the preferred embodiments, it is assumed that the user operates the touch panel 69 with his/her finger. The operation detector 46 detects a "touch operation" when the user's finger touches the touch panel 69 and a "release operation" when the user's finger leaves the touch panel 69. In particular, the operation detector 46 detects a "tap operation" when the interval between a touch operation and a release operation is short (less than a predetermined time interval), typically when the user taps the touch panel 69. Also, the operation detector 46 detects a "long touch operation" when a release operation is not detected for a predetermined time (e.g., 500 ms) or longer after the detection of a touch operation.

Also, the operation detector 46 detects a "trace operation" when the user traces the touch panel 69 with a finger without releasing it immediately. The trace operation is also referred to as the "slide operation" or "drag operation". Moreover, the operation detector 46 even detects a short slide operation in a manner of flicking the touch panel 69 as a "flick operation". The operation detector 46 also obtains from the touch panel 69 the coordinates indicating the position where any of the various operations on the touch panel 69 took place. The operation detector 46 is capable of distinguishing between the operation by the user on the touch panel 69, the position of the operation, and the object (icon or the like) on the screen upon which the operation has been performed.

The screen change control unit 48 sends an instruction for a screen change to the display control unit 52 according to the kind of operation detected by the operation detector 46 and the rules of screen change shown in FIG. 3. For example, if a tap operation on a specific photo image is detected during the display of the home screen 110 or the list screen 120, the screen change control unit 48 gives an instruction to the display control unit 52 to cause a display of the photo information screen 130 for the photo image. Also, if a tap operation on a user category icon is detected during the display of the home screen 110, the screen change control unit 48 gives an instruction to the display control unit 52 to cause a display of the user screen 122. The screen change control unit 48 also communicates identification information on the screen after the screen change to the content acquiring unit 50, thereby allowing the content acquiring unit 50 to acquire an electronic content to be displayed on the screen after the screen change from the photo sharing server 10.

The content acquiring unit 50 acquires an electronic content (e.g., photo image, text data of comment, tag, user profile, etc.) held by the photo sharing server 10 by accessing the photo sharing server 10 and calling an API (Application Programming Interface) made public by the photo sharing site. For example, the content acquiring unit 50 acquires the photo images and the titles of photographs posted recently by a user or users by calling an API for the acquisition of those photographs. Also, the content acquiring unit 50 may, for instance, acquire the photo images and the titles of a list of photographs (called a "photo stream" also) associated with the users on the photo sharing site by calling an API for their acquisition.

The information input supporting unit 62 executes processings designed to support the input of information by the user related to any of the various screens displayed on the display device 68. More specifically, when an operation indicating a request for information input is detected, the information input supporting unit 62 causes a display of a software keyboard on the screen and sends a character string specified by the user through the software keyboard to the display control unit 52, thereby causing a relevant screen display.

The posting processing unit 64 uploads the photo images shot by a user or users to the photo sharing server 10 by accessing the photo sharing server 10 and calling an API made public by the photo sharing site. Similarly, the posting processing unit 64 uploads the text data of comment or tag prepared by the user relative to a photograph or photographs he/she has viewed to the photo sharing server 10.

The display control unit 52 causes a display on the display device 68 of the various screens in a photo viewing application as shown in FIG. 3 by setting each screen data thereon according to the operation by the user. The display control unit 52 includes a home screen display control unit 54, a user screen display control unit 56, a photo information screen display control unit 58, and a full-screen display control unit 60. Although not shown in FIG. 4, the display control unit 52 may further include a search result display unit for displaying the result of a search for the photo sharing server 10.

The home screen display control unit 54 causes a display of the menu list screen 112 or the individual menu screen 114 by setting the screen data thereon. The user screen display control unit 56 causes a display of the user screen 122 by setting the screen data thereon. The photo information screen display control unit 58 causes a display of the photo information screen 130 by setting the screen data thereon.

The full-screen display control unit 60 causes a display of the full-screen viewer 140 by setting the screen data thereon. More specifically, when a predetermined operation, such as a tap on a photo image on the photo information screen 130, is detected, the full-screen display control unit 60 causes a full-screen display on the display device 68 of the photo image displayed on the photo information screen 130.

Figure 5:
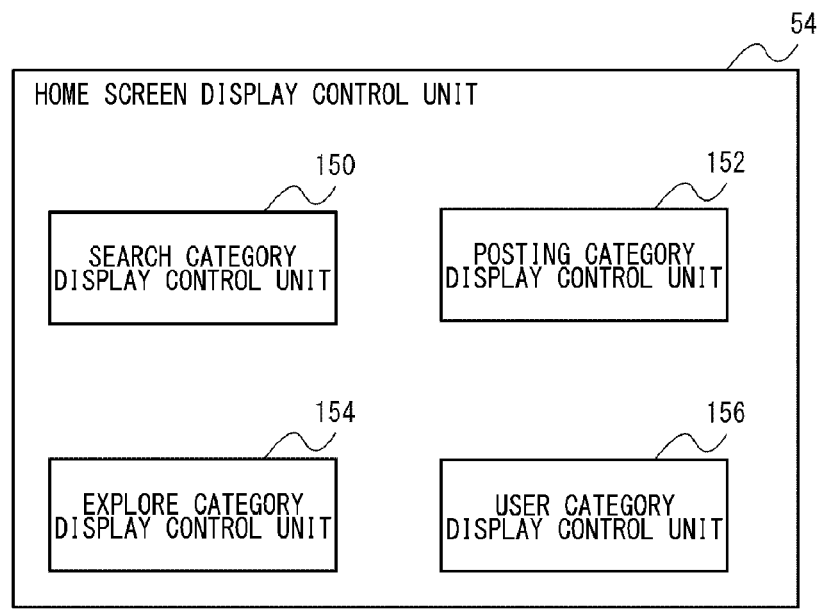
FIG. 5 is a block diagram showing a detailed structure of a home screen display control unit.

FIG. 5 is a block diagram showing a detailed structure of the home screen display control unit 54. The home screen display control unit 54 includes a search category display control unit 150, a posting category display control unit 152, an explore category display control unit 154, a user category display control unit 156. A description is given hereunder of each functional block of FIG. 5 in combination with the explanation of FIG. 6 and FIG. 7.

Figure 6:
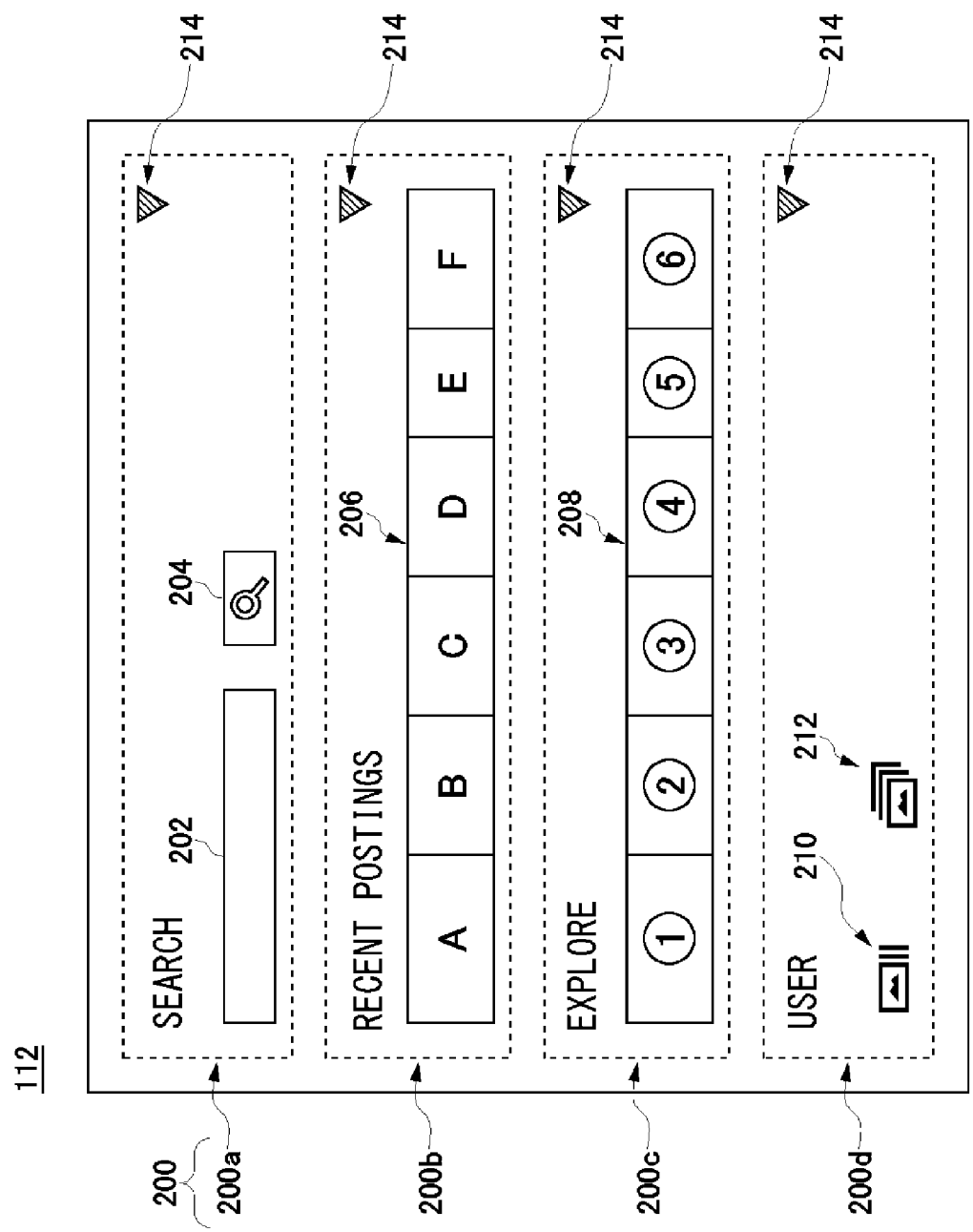
FIG. 6 illustrates a menu list screen.

FIG. 6 illustrates a menu list screen 112. Though not displayed on the screen, the menu list screen 112 is divided into display areas for the respective categories. More specifically, the menu list screen 112 includes a search category area 200a, a recent upload category area 200b, an explore category area 200c, a user category area 200d (hereinafter generically referred to as "category area 200" or "category areas 200" as appropriate).

The search category display control unit 150 sets the display data for the search category area 200a. More specifically, a search character string field 202 and a search button 204 are displayed in the search category area 200a.

The posting category display control unit 152 sets the display data for the recent upload category area 200b. More specifically, a plurality of photo images 206 obtained by the content acquiring unit 50, which are recently posted by a user or users, are placed and displayed side by side within a single line in descending order of posting date and time. FIG. 6 illustrates a state where six photo images 206 of "A" to "F" are displayed. When a user's flick operation is detected on the display area of the display images 206, the posting category display control unit 152 slides and displays the photo images 206 in the flicked direction. For example, in response to a flick operation to the left, the current display of the photo images of "A", "B", "C", "D", "E" and "F" is now updated to the display of the photo images of "D", "E", "F", "G", "H" and "I".

The explore category display control unit 154 sets the display data for the explore category area 200c. More specifically, a plurality of photo images 208 obtained from the content acquiring unit 50 are placed and displayed side by side within a single line. Here, the photo images 208 are photos acquired by calling an API for use in the explore and therefore they may be thought of as the photos included in the user's photo stream. FIG. 6 illustrates a state where six photo images 208 of "1" to "6" are displayed. When a user's flick operation is detected on the display area of the photo images 208, the explore category display control unit 154 slides and displays the photo images 208 in the flicked direction, similarly to the posting category display control unit 152.

Note that a slide-display of photo images 206 in the posting category area 200b and a slide-display of photo images 208 in the explore category area 200c are done independently of each other. That is, when a flick operation on a photo image 206 in the posting category area 200b is detected, the posting category display control unit 152 slides the photo images 206 but the explore category display control unit 154 does not slide the photo images 208 and maintains the display contents before the flick operation. When a flick operation on a photo image 208 in the explore category area 200c is detected, the explore category display control unit 154 slides the photo images 208 but the posting category display control unit 152 does not slide the photo images 206 and maintains the display contents before the flick operation.

The user category display control unit 156 sets the display data for the user category area 200d. More specifically, a photo list icon 210 and an album list icon 212 are displayed in the user category area 200d. When a user's tap operation on the photo list icon 210 is detected, the screen changes to the user screen 122 indicating a user's photo list. Also, when a user's tap operation on the album list icon 212 is detected, the screen changes to the user screen 122 indicating a user's album list. Although FIG. 6 shows that there are two icons in the user category area 200d, eight icons corresponding to content specifying icons 246 described later may be displayed in the user category area 200d.

Also, all parts of the menu list screen 112 may not be simultaneously displayed within the screen of the display device 68. For example, part of the category areas 200 of FIG. 6 may be displayed while the remaining part thereof may not be displayed. The user may perform a slide operation in the vertical direction on the touch panel 69 so as to display the category areas 200 that have been hidden so far. Though not shown in FIG. 6, the home screen display control unit 54 may display a background image on the menu list screen 112 and may display the image of each category area 200 in such a manner that the image of each category area 200 is superposed on the background image. In this case, when a slide operation in the vertical direction is detected, the home screen display control unit 54 slides the image of each category area 200 and also slides the background image independently of the image of each category area 200. More specifically, the displaying is controlled such that the shift amount of the background image as a result of the vertical slide operation is smaller than that of each category area 200.

Although FIG. 6 shows the four categories on the menu list screen 112, other additional menus (categories) offered by the photo sharing site may be also included in the menu list screen 112. For example, a photo category of "recent activity" where, among the photos posted by a user, the favorites or comments are set by other users, a category for photos posted by the user's friends, an "operation history" category for the photo sharing site, and other categories may further be included therein. The home screen display control unit 54 may further include a function of setting the display data for these additional categories.

Also, an open icon 214 by which to enlarge the category area 200 is displayed in each category area 200. As an open icon 214 is tapped by the user, an individual menu screen 114 associated with a category area 200 having the open icon 214 tapped thereby is displayed.

Figures 7, 8:
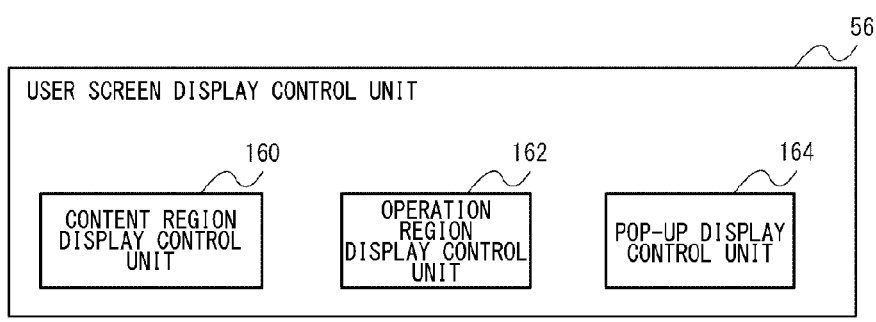
FIG. 7 illustrates an individual menu screen.
FIG. 8 is a block diagram showing a detailed structure of a user screen display control unit.

FIG. 7 illustrates an individual menu screen 114. FIG. 7 illustrates the individual menu screen 114 where the posting category area 200b is enlarged. When the open icon 214 of the posting category area 200b is tapped in the menu list screen 112, the posting category display control unit 152 causes a display of the individual menu screen 114 as shown in FIG. 7. The posting category display control unit 152 places and displays a plurality of photo images 220 obtained by the content acquiring unit 50 adjacent to each other over a plurality of lines in descending order of posting date and time. FIG. 7 illustrates a state where fifteen photo images 220 of "A" to "O" are displayed over the three lines. The titles 222 of the photo images 220 obtained by the content acquiring unit 50 are displayed such that the titles 222 thereof are associated with the respective photos. When a vertical slide operation is detected on the individual menu screen 114, other photo images which haven't been hidden before are further displayed.

Also, the posting category display control unit 152 displays a close icon 224, by which to close the enlarged category (i.e., by which to terminate the enlarged display of the category) on the individual menu screen 114. As shown in FIG. 7, the close icon 224 is oriented in a reverse direction relative to the open icon 214. That is, the open icon 214 and the close icon 224 are displayed in such a manner that they are identifiable by the user. As a tap operation on the close icon 224 is detected in the individual menu screen 114, the menu list screen 112 is displayed again. A description has been given above of an example related to the posting category display control unit 152 but the display control units for the other categories operate similarly. In other words, an individual menu screen 114 for a category selected as a result of a tap operation on the open icon 214 is displayed, and the displaying of the individual menu screen 114 is terminated according to a tap operation on the close icon 224.

As described above, the photo images belonging to each menu is displayed in a single line on the menu list screen 112, which is the top screen. This makes it easy for the user to grasp the photos that can be viewed through a selection of each menu and also reduces a burden on the user required until he/she finds a desired menu (e.g., a burden placed on the user's slide operation). That is, under a constraint of limited size of the display device 68, the menu required by the user can be efficiently selected from among a plurality of menus offered by the photo sharing site. Also, the photo images belonging to the menu selected by the user are displayed over a plurality of rows (lines) in the individual menu screen 114. Thus as many photo images as possible can be simultaneously presented to the user.

FIG. 8 is a block diagram showing a detailed structure of the user screen display control unit 56. The user screen display control unit 56 includes a content region display control unit 160, an operation region display control unit 162, a pop-up display control unit 164. A description is given hereunder of each functional block of FIG. 8 in combination with the explanation of FIG. 9 to FIG. 14.

Figure 9:
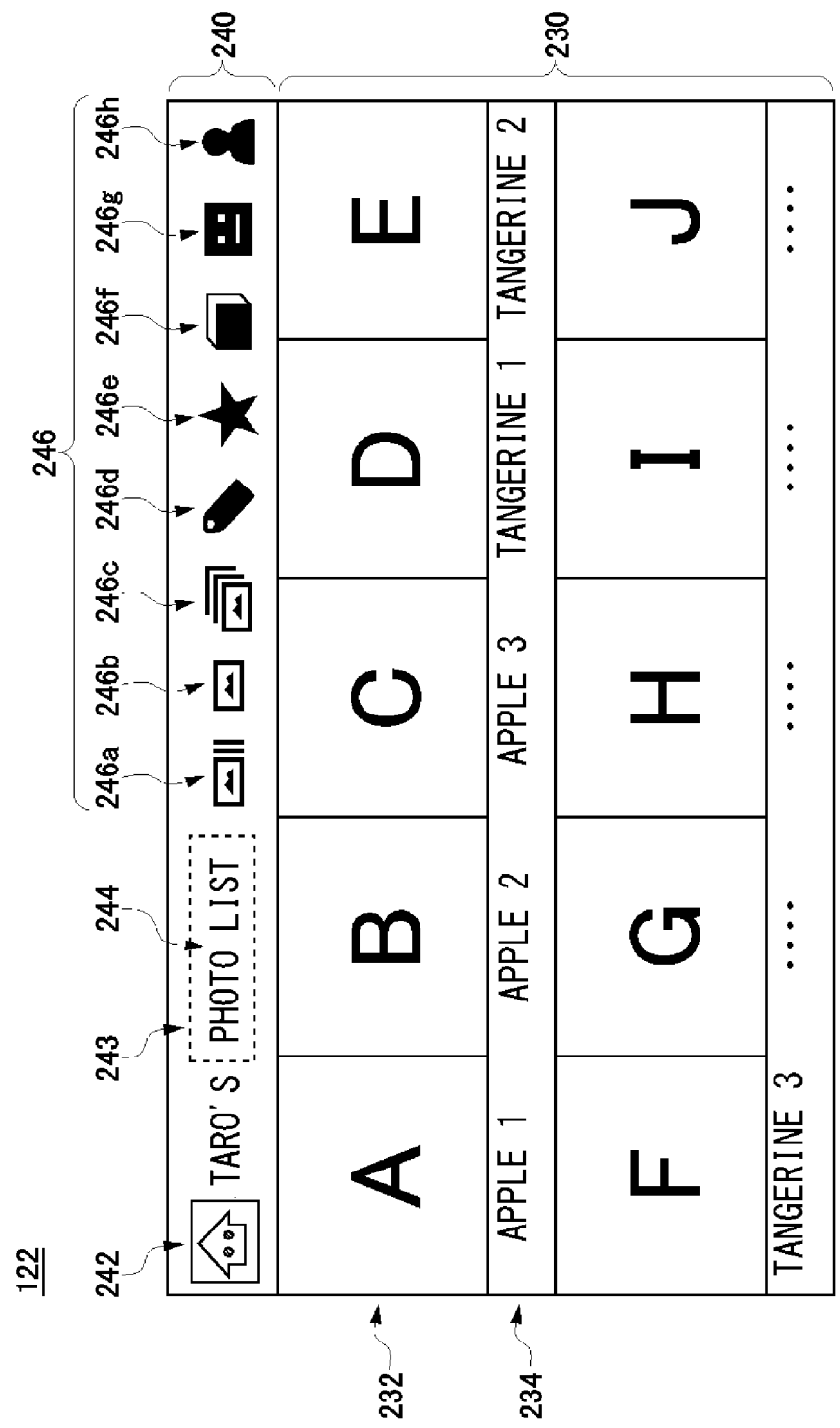
FIG. 9 illustrates a user screen.
Figure 10:
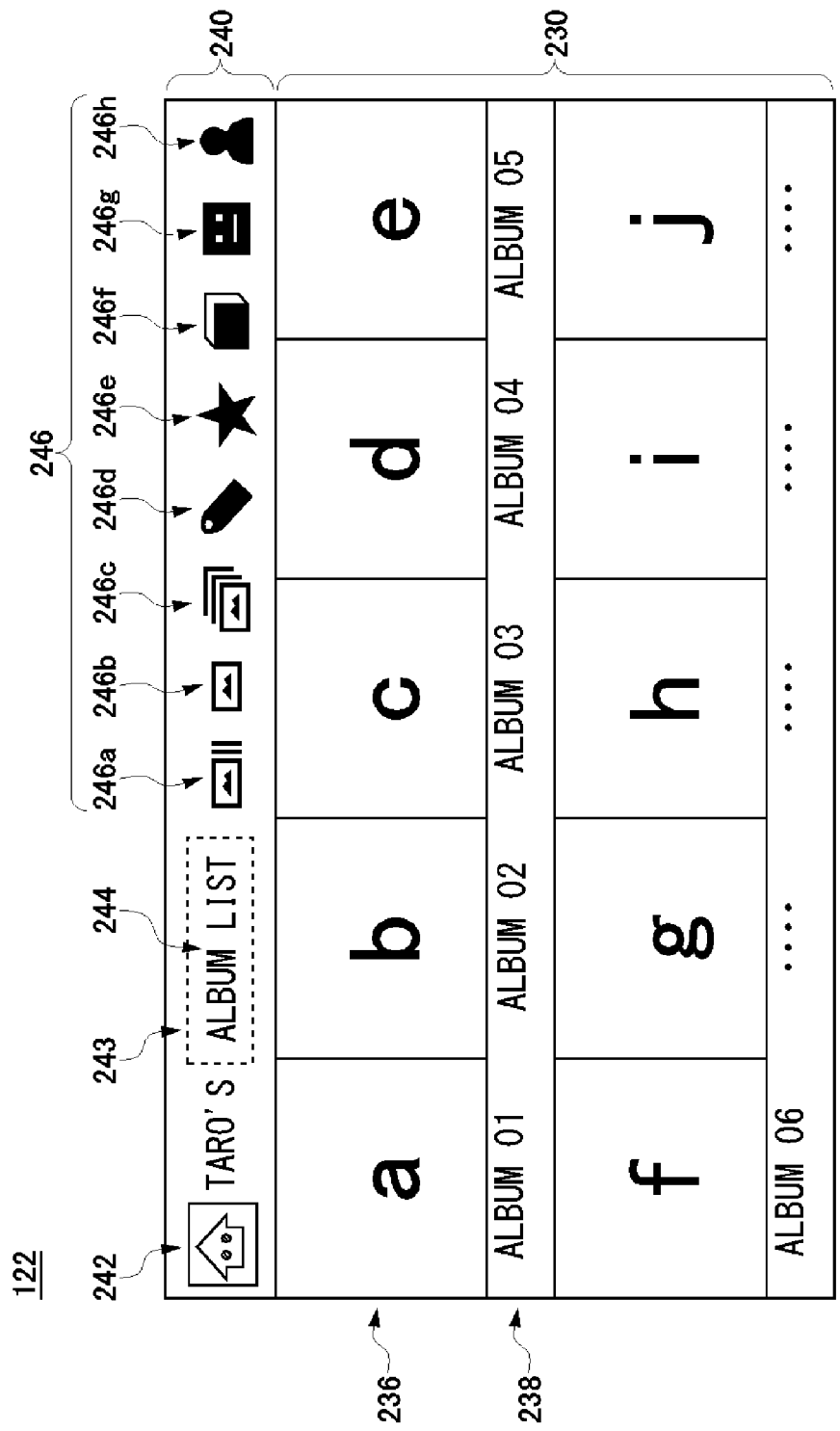
FIG. 10 illustrates a user screen.

FIG. 9 and FIG. 10 each illustrates a user screen 122. FIG. 9 illustrates a user screen 122 displaying a user's photo list, whereas FIG. 10 illustrates a user screen 122 displaying a user's album list. The user screen 122 includes a content region 230 for displaying images, such as photos, and text data related to the user and an operation region 240 for displaying an icon with which the user selects a content displayed in the content region 230.

The content region display control unit 160 sets the display data for the content region 230. If the user screen 122 (FIG. 9) of the user's photo list is to be displayed, the content region display control unit 160 will display, in the photo sharing site, photo images 232 and photo titles 234 related to the user by associating them with each other. If the user screen 122 (FIG. 10) of the user's album list is to be displayed, the content region display control unit 160 will display, in the photo sharing site, album images 236 and album titles 238 related to the user by associating them with each other.

The operation region display control unit 162 sets the display data for the operation region 240. The operation region display control unit 162 displays a home icon 242 with which to allow the screen to return to the menu list screen 112. Also, the operation region display control unit 162 places a photo list icon 246a, a gallery icon 246b, an album list icon 246c, a tag list icon 246d, a favorite icon 246e, an archive icon 246f, a friend icon 246g, and a profile icon 246h, which are generically referred to as "content specifying icon 246" or "content specifying icons 246", and displays them adjacent to each other. The content region display control unit 160 updates the display content of the content region 230 according to a user's operation to select a content specifying icon 246.

Also, the operation region display control unit 162 displays, in a screen explanatory region 243 of the operation region 240, screen explanatory data 244 containing the caption for a content currently being displayed in the content region 230. The screen explanatory data 244 may be thought of as an explanatory caption for a content specifying icon 246 currently being selected. The operation region display control unit 162 may further display an icon image corresponding to the content being displayed, as the screen explanatory data 244.

As a tap operation on the album list icon 246c is detected in the user screen 122 of FIG. 9, the content region display control unit 160 and the operation region display control unit 162 update the display content of the user screen 122 to the content shown in FIG. 10. That is, the display content of the content region 230 is changed to the album list from the photo list, and the screen explanatory data 244 is changed to the "album list" from the "photo list", too.

When the display content of the content region 230 is to be switched, the content region display control unit 160 causes the screen for a switching source content (e.g., a photo image, a photo title, a tag character string, and profile information) to slide out and, at the same time, causes the screen for a switching destination content to slide in. When the display content of the screen explanatory region 243 is to be switched, the operation region display control unit 162 causes the screen explanatory data 244 for the switching source content to slide out and, at the same time, causes the image explanatory data 244 for the switching destination content to slide in.

Figure 11:
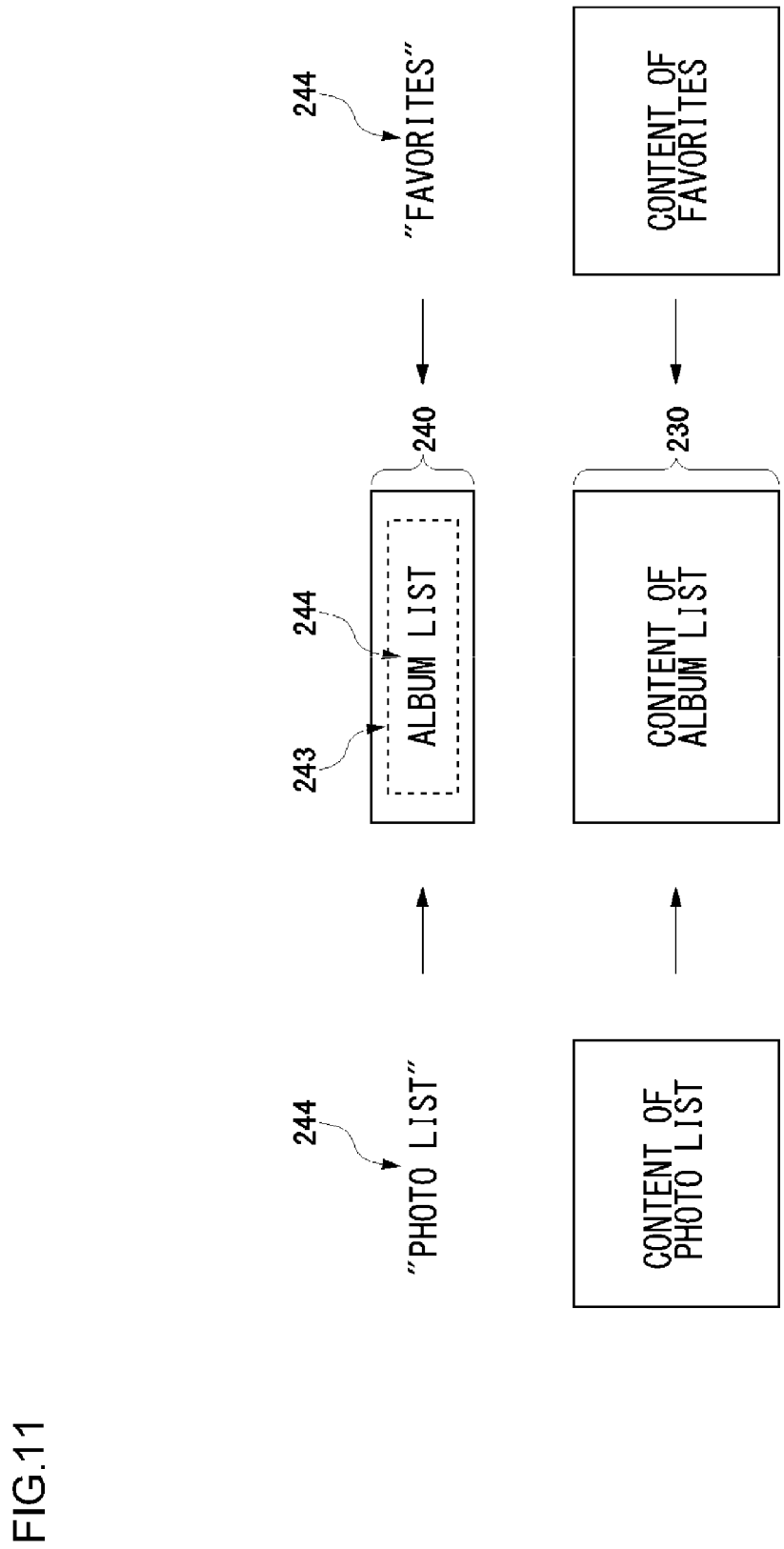
FIG. 11 schematically illustrates the updating of a display content on a user screen.

FIG. 11 schematically illustrates the updating of a display content in the user screen 122. Assume that an album list is displayed in the user screen 122 before the updating (i.e., in the switching-source user screen 122). In other words, assume that the album list icon 246c is selected.

Now, assume also that a tap operation on the photo list icon 246a located to the left of the album list icon 246c is detected in this operation region 240. In this case, the content region display control unit 160 causes the content of the album list to slide out rightward in the content region 230 so as to be hidden and, at the same time, causes the content of the photo list to slide in rightward from the left side of the content region 230. The operation region display control unit 162 causes the screen explanatory data 244 for the "album list" to slide out rightward in the screen explanatory region 243 so as to be hidden and, at the same time, causes the explanatory data 244 for the "photo list" to slide in rightward from the left side of the screen explanatory region 243.

Assume, on the other hand, that a tap operation on the favorite icon 246e located to the right of the album list icon 246c is detected in this operation region 240. In this case, the content region display control unit 160 causes the content of the album list to slide out leftward in the content region 230 so as to be hidden and, at the same time, causes the content of the favorites to slide in leftward from the right side of the content region 230. The operation region display control unit 162 causes the screen explanatory data 244 for the "album list" to slide out leftward in the screen explanatory region 243 so as to be hidden and, at the same time, causes the explanatory data 244 for the "favorites" to slide in leftward from the right side of the screen explanatory region 243.

As described above, the display content of the user screen 122 is updated according to the positional relationships between a previously selected icon and a newly selected icon. Thus it is easy for the user to intuitively grasp whether selected is an icon located to the left or to the right of the previously selected icon. Also, even when there are many content specifying icons 246 arranged in the operation region 240, it is easy for the user to intuitively grasp the position of each icon.

Figure 12:
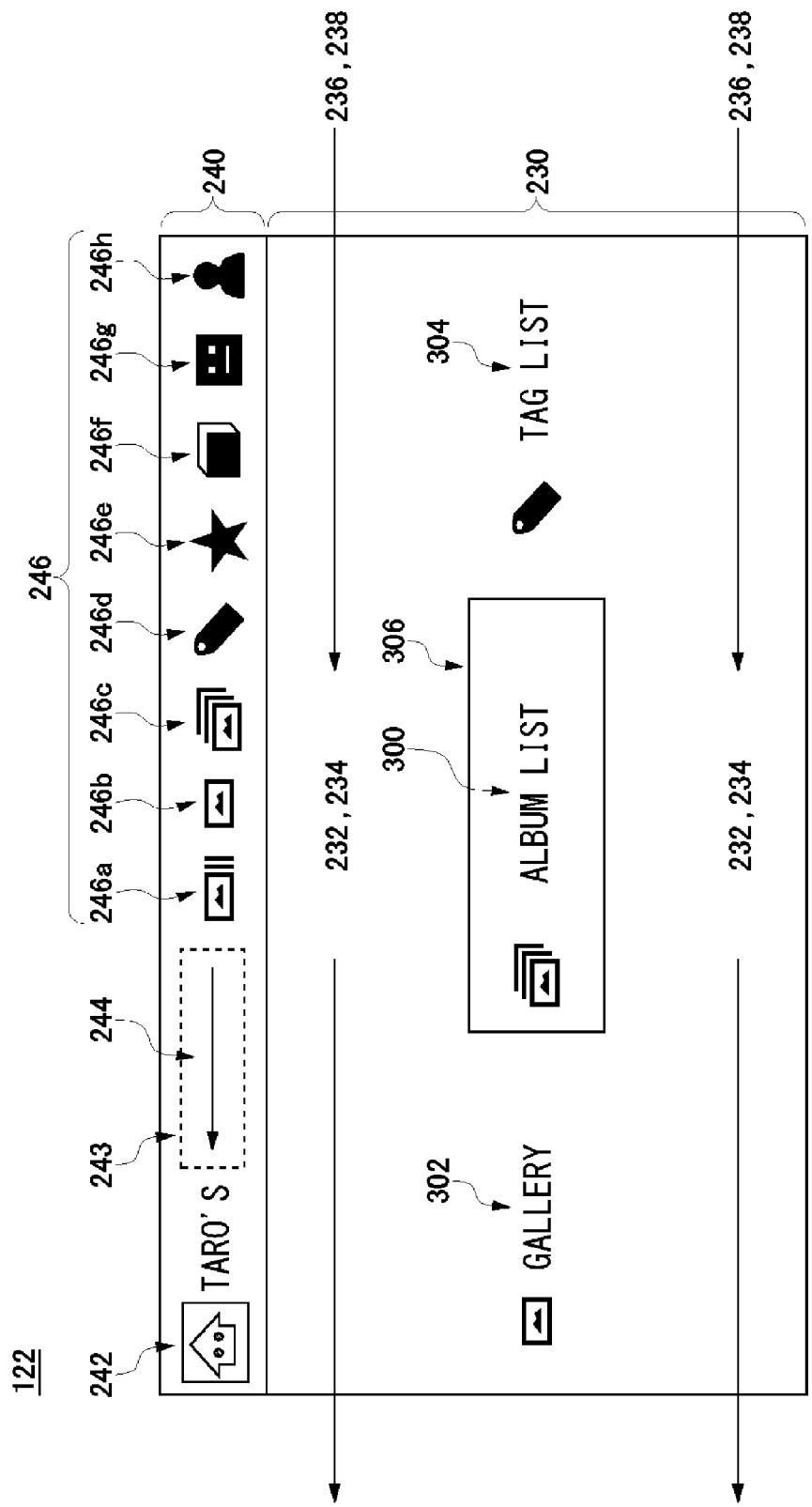
FIG. 12 schematically illustrates the updating of a display content on a user screen.

FIG. 12, too, schematically illustrates the updating of a display content in the user screen 122. When a tap operation on the content specifying icon 246 is detected, the pop-up display control unit 164 displays an emphasis region 306 in an approximate center of the content region 230 in a popped-up or forefront manner. Here, the emphasis region 306 is a region used to highlight the information concerning an icon selected by the tap operation (hereinafter referred to as "selected icon" also). At the same time, selected icon explanatory data 300 containing the image of a selected icon and its caption (in other words, explanatory text or supplemental information) is popped up in the emphasis region 306. Also, left-hand icon explanatory data 302 that is explanatory data for an icon located to the immediate left of the selected icon in the operation region 240 is popped up to the immediate left of the selected icon explanatory data 300. Also, right-hand icon explanatory data 304 that is explanatory data for an icon located to the immediate right of the selected icon is popped up to the immediate right of the selected icon explanatory data 300.

The pop-up display control unit 164 displays the selected icon explanatory data 300, the left-hand icon explanatory data 302, the right-hand icon explanatory data 304, and the emphasis region 306 in such a manner that they are superposed over a content of the content region 230. Hereinafter, the selected icon explanatory data 300, the left-hand icon explanatory data 302, the right-hand icon explanatory data 304, and the emphasis region 306 will be generically referred to as "operation guide" also. The pop-up display control unit 164 displays the selected icon explanatory data 300 in a manner such that the selected icon explanatory data 300 is larger than the content specifying icon 246 in size. Since the size of the content region 230 is larger than that of the operation region 240, displaying the operation guide in the content region 230 can enhance the visibility of the caption for the selected icon.

The pop-up display control unit 164 displays the operation guide while the display content of the content region 230 and the display content of the screen explanatory region 243 are being updated. FIG. 12 shows a case where the user screen 122 (FIG. 9) of the photo list is changed to the user screen 122 (FIG. 10) of the album list. The pop-up display control unit 164 displays the operation guide for a time duration T required for the photo image 232 and the photo title 234 to slide out and for the album image 236 and the album title 238 to slide in, or for less than T. In other words, as soon as the content region display control unit 160 and the operation region display control unit 162 terminate the updating of the user screen 122, the pop-up display control unit 164 hides the operation guide.

In a modification, the pop-up display control unit 164 may display the operation guide for a predetermined time duration. In another modification, when the passage of a certain time equal to or less than the predetermined time duration is detected, the permeability of the operation guide may be gradually increased and then the operation guide may be completely hidden when the predetermined time duration has elapsed.

A description is now given of a processing performed when a long touch operation on a content specifying icon 246 is detected or when a trace operation over the other content specifying icons 246 is detected after the touch operation on a specific content specifying icon has been detected.

During a long touch operation on the content specifying icon 246 and a trace operation thereon, the content region display control unit 160 suppresses the updating of content in the content region 230. In other words, the content region display control unit 160 maintains the display content before the long touch operation and the trace operation. And when a release operation is detected after the long touch operation or trace operation, it is determined that the content specifying icon 246 located in the position where the release operation took place has been selected and therefore the display content of the content region 230 is updated.

Similarly, during a long touch operation on the content specifying icon 246 and a trace operation thereon, the operation region display control unit 162 withholds the screen explanatory data 244 in the screen explanatory region 243. In other words, the operation region display control unit 162 maintains the screen explanatory data 244 displayed before the long touch operation and the trace operation. And when a release operation is detected after the long touch operation or trace operation, it is determined that the content specifying icon 246 in the position where the release operation took place has been selected and therefore the screen explanatory data 244 in the screen explanatory region 243 is updated.

That is, the content region display control unit 160 and the operation region display control unit 162 update the user screen 122, in the same way, upon detection of a tap operation and a long touch operation plus a release operation, respectively.

When, on the other hand, a touch operation on any of the content specifying icons 246 is detected, the pop-up display control unit 164 displays the display guide for an icon associated with the position where the touch operation took place, no matter whether the operation is a tap operation or a long touch operation, namely irrespective of the timing of the release operation. When a trace operation over a plurality of content specifying icons 246 is detected, the pop-up display control unit 164 sequentially switches the information on icons selected sequentially by the trace operation and displays the thus switched icon information in the emphasis region 306 as the selected icon explanatory data 300. In this manner, the operation that switches the display content on the screen by selecting an icon and the operation that causes the caption for the icon selected are combined together in the mobile game device 12. In other words, both the screen display content switching operation and the operation causing the caption for the selected icon are realized using the same user interface.

Figure 13:
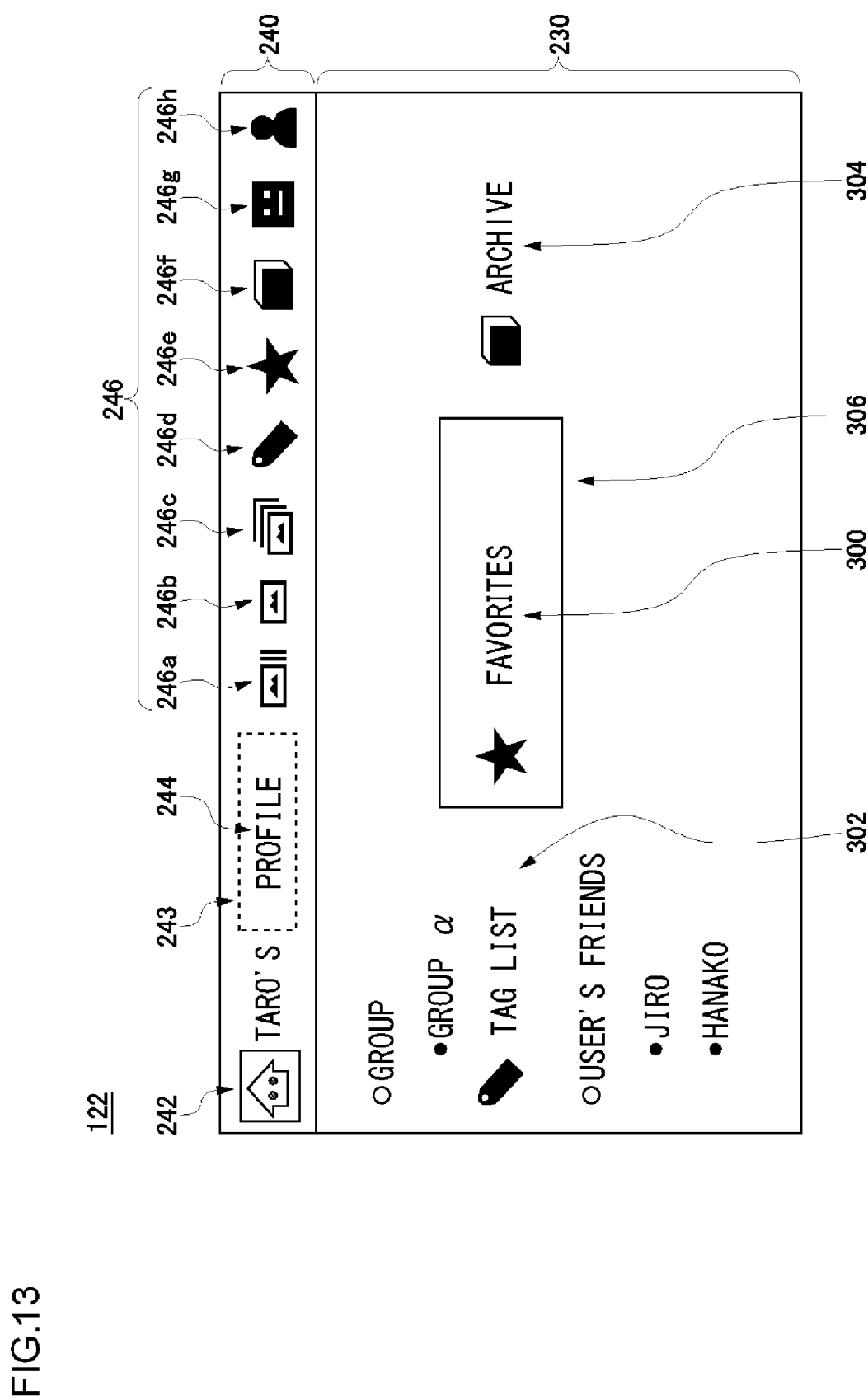
FIG. 13 illustrates a user screen.

FIG. 13 illustrates a user screen 122. FIG. 13 shows an example of display of the user screen 122 of user profile when the favorite icon 246e has been selected by a long touch. While the content region display control unit 160 and the operation region display control unit 162 maintain the display contents before the long touch, the pop-up display control unit 164 causes a display of the operation guide in a manner of displaying the selected icon explanatory data 300 in the emphasis region 306 for the long-touched favorite icon 246e. Note that at this point, with the user releasing his/her finger from the favorite icon 246e, the screen will switch to the user screen 122 showing the user's favorite content.

With the tag list icon 246d selected as a result of a trace operation leftward from the favorite icon 246e on the user screen 122 of FIG. 13, the pop-up display control unit 164 updates the operation guide to display the selected icon explanatory data 300 in the emphasis region 306 for the newly selected tag list icon 246d. On the other hand, the content region display control unit 160 and the operation region display control unit 162 maintain the display contents before the trace operation (that is, FIG. 13).

Figure 14:
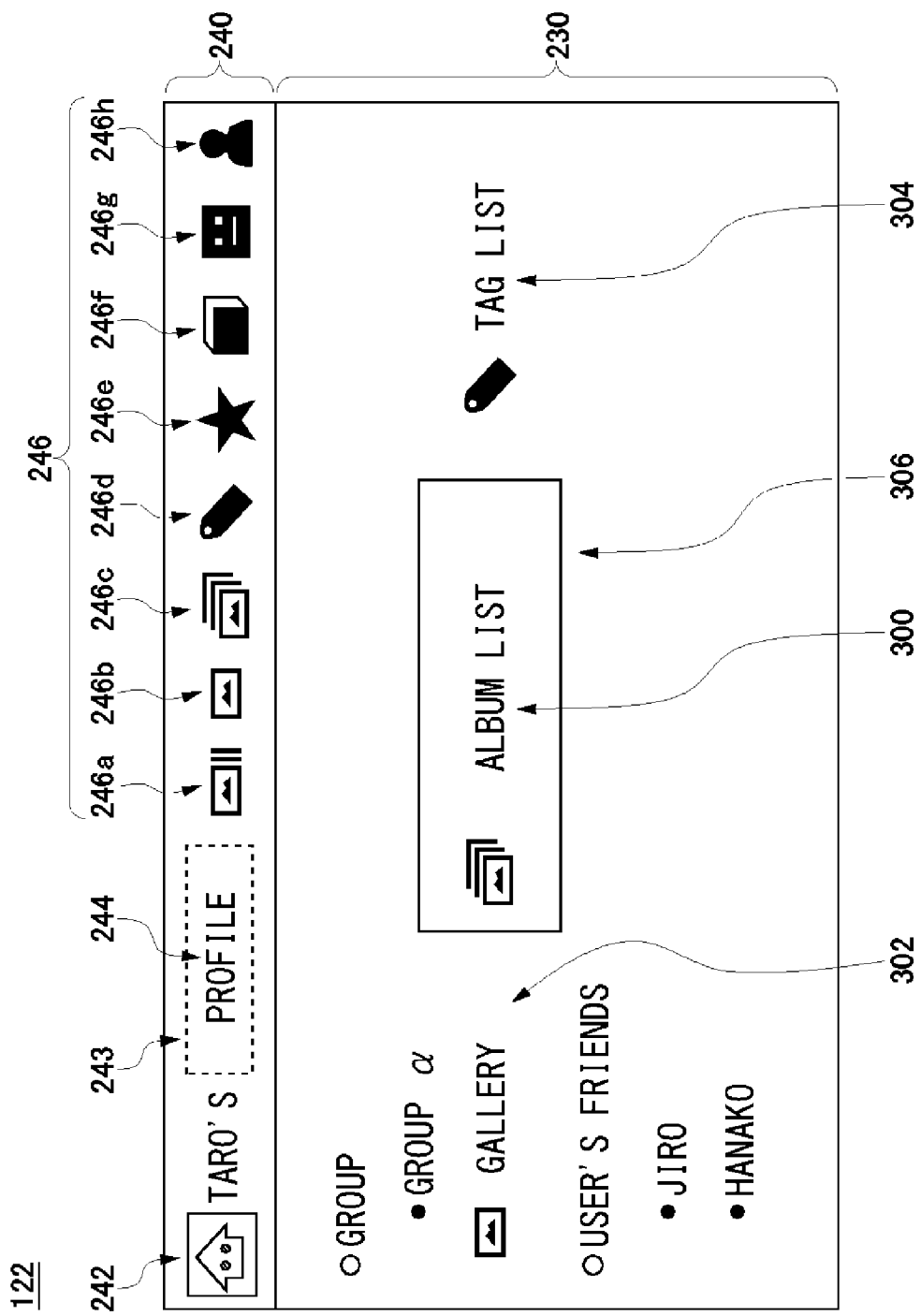
FIG. 14 illustrates a user screen.

FIG. 14 illustrates a user screen 122. FIG. 14 shows an example of display of a user screen 122 when a trace operation has been done leftward from the favorite icon 246e to the album list icon 246c on the user screen 122 of FIG. 13. In this case, the pop-up display control unit 164 updates the operation guide to display the selected icon explanatory data 300 in the emphasis region 306 for the newly selected album list icon 246c. On the other hand, the content region display control unit 160 and the operation region display control unit 162 maintain the display contents before the trace operation.

With the switching of selected icons during a trace operation, the pop-up display control unit 164 causes the caption for the icon whose selection has been canceled (hereinafter referred to as "previously selected icon" also) to slide out of the emphasis region 306. At the same time, the pop-up display control unit 164 causes the caption for the icon which has been newly selected (hereinafter referred to as "newly selected icon" also) to slide into the emphasis region 306, thus displaying it as the selected icon explanatory data 300.

More specifically, when a newly selected icon is located to the immediate left of a previously selected icon in the operation region 240, that is, when selected icons are switched by a leftward trace operation, the pop-up display control unit 164 causes the caption for the previously selected icon to slide rightward out of the emphasis region 306 to be displayed as right-hand icon explanatory data 304. At the same time, the pop-up display control unit 164 causes the caption for the newly selected icon, which has been displayed as the left-hand icon explanatory data 302, to slide from the left side into the emphasis region 306 to be displayed as the selected icon explanatory data 300.

For example, in FIG. 13, if a trace operation is done from the favorite icon 246e to the tag list icon 246d, the caption for the favorite icon 246e will slide rightward out of the emphasis region 306 to become the right-hand icon explanatory data 304. At the same time, the caption for the tag list icon 246d will slide rightward into the emphasis region 306. At this time, the caption for the album list icon 246c will slide in from the left side of the user screen 122 to be newly displayed as the left-hand icon explanatory data 302. A similar processing will follow a trace operation from the tag list icon 246d to the album list icon 246c, thereby causing a display of FIG. 14.

Also, when a newly selected icon is located to the immediate right of a previously selected icon in the operation region 240, that is, when selected icons are switched by a rightward trace operation, the pop-up display control unit 164 causes the caption for the previously selected icon to slide leftward out of the emphasis region 306 to be displayed as left-hand icon explanatory data 302. At the same time, the pop-up display control unit 164 causes the caption for the newly selected icon, which has been displayed as the right-hand icon explanatory data 304, to slide from the right side into the emphasis region 306 to be displayed as the selected icon explanatory data 300.

In this manner, a caption for a sequentially selected icon by a leftward trace operation is slid sequentially rightward into the emphasis region 306, thus updating the operation guide. Also, a caption for a sequentially selected icon by a rightward trace operation is slid sequentially leftward into the emphasis region 306, thus updating the operation guide. As a result, even when there are many content specifying icons 246 arranged in the operation region 240, it is easy for the user to intuitively grasp the positional relationships between the icons.

It should be noted that the pop-up display control unit 164 updates the operation guide at a speed corresponding to the speed of trace operation on the content specifying icons 246. In other words, the faster the speed of tracing over the content specifying icons 246, that is, the quicker the switching of the selected icons, the higher the speed the pop-up display control unit 164 will set for the slide-in and slide-out of the captions for the icons.

If a release operation from the album list icon 246c on the user screen 122 of FIG. 14 is detected, the user screen 122 of an album list as shown in FIG. 10 will be displayed. More specifically, the content region display control unit 160 will cause the content of user profile to slide out rightward and at the same time the content of album list to slide in rightward from the left side of the content region 230. Also, the operation region display control unit 162 will cause the screen explanatory data 244 for "profile" to slide out rightward and at the same time the screen explanatory data 244 for "album list" to slide in rightward from the left side of the screen explanatory region 243. Upon completion of the updating of the user screen 122 associated with the release operation, the pop-up display control unit 164 terminates the display of the operation guide.

Though partially described above, there are cases where the photo viewing application displays many kinds of contents and a great number of content specifying icons 246 are simultaneously displayed on the display device 68 of the mobile game device 12. As already mentioned, the operation region 240 is smaller than the content region 230 in size. Thus, if a large number of content specifying icons 246 are to be arranged in the operation region 240, the size of each of those icons 246 must be set to a smaller size. This may make it difficult to select an appropriate icon with which to display a content desired by the user.

When a content specifying icon 246 is pressed with a long touch in the mobile game device 12 according to the present embodiment, it is not determined that the content specifying icon 246 is actually selected unless the finger is completely released from the content specifying icon 246. Thus, while checking the icon displayed in the operation guide, the user can trace over a plurality of content specifying icons 246 and select a desired content specifying icon 246. This can support the user in appropriately selecting a desired icon even though many content specifying icons are arranged in the operation region 240, thereby suppressing drop in operability of the user screen 122.

If the display contents of the content region 230 and the screen explanatory region 243 are updated every time the selected icons are switched by the trace operation, the display contents may be changed frequently and some unintended contents may be acquired. This may have the adverse effect of reducing the user's convenience. In the present embodiment, changing the display contents of the content region 230 and the screen explanatory region 243 is withheld and the operation guide only is updated until any of the content specifying icon 246 is finally and determinably selected by the release operation after the trace operation. This can prevent the user's convenience from being decreased.

Figure 15:
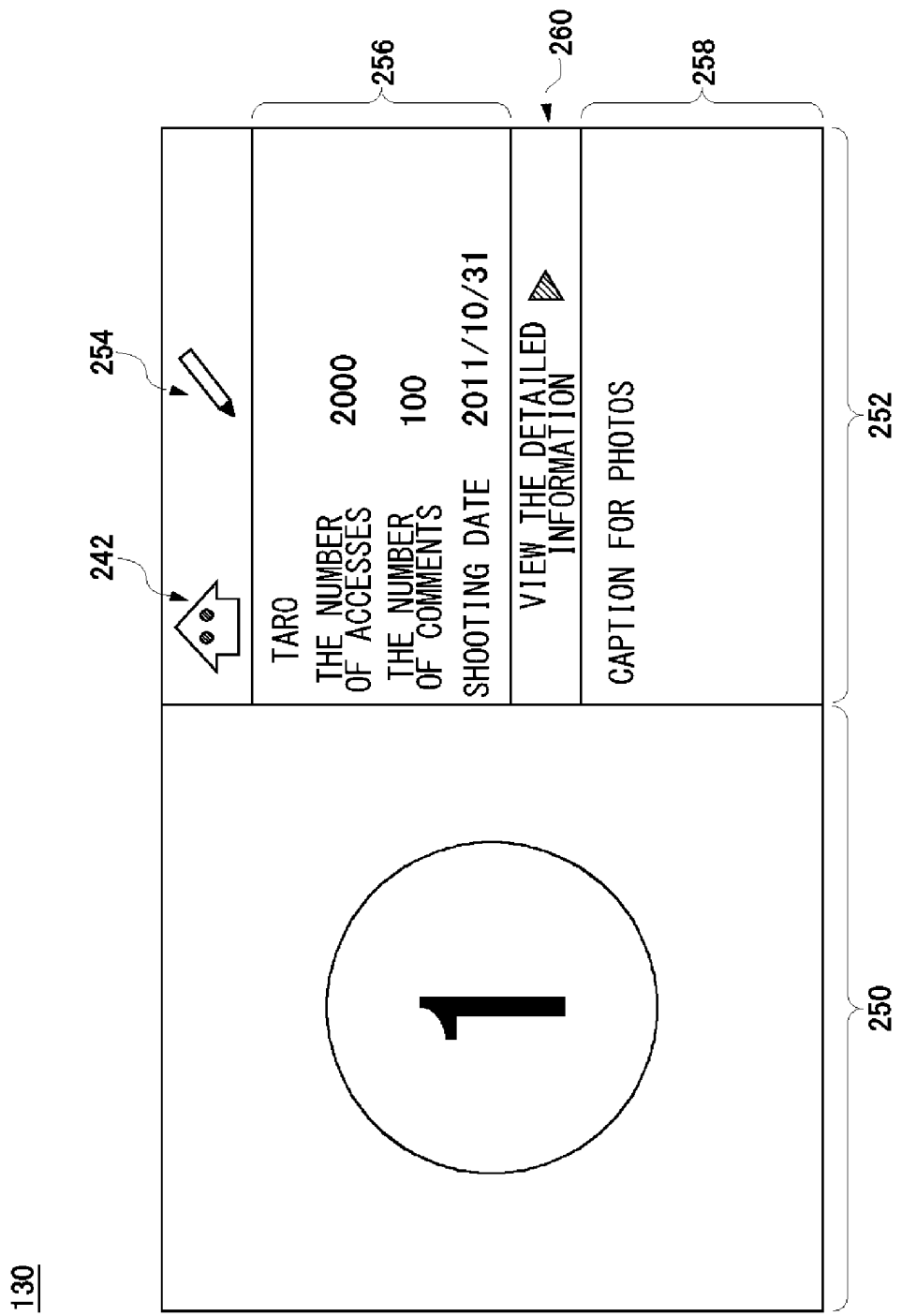
FIG. 15 illustrates a photo information screen.
Figure 16:
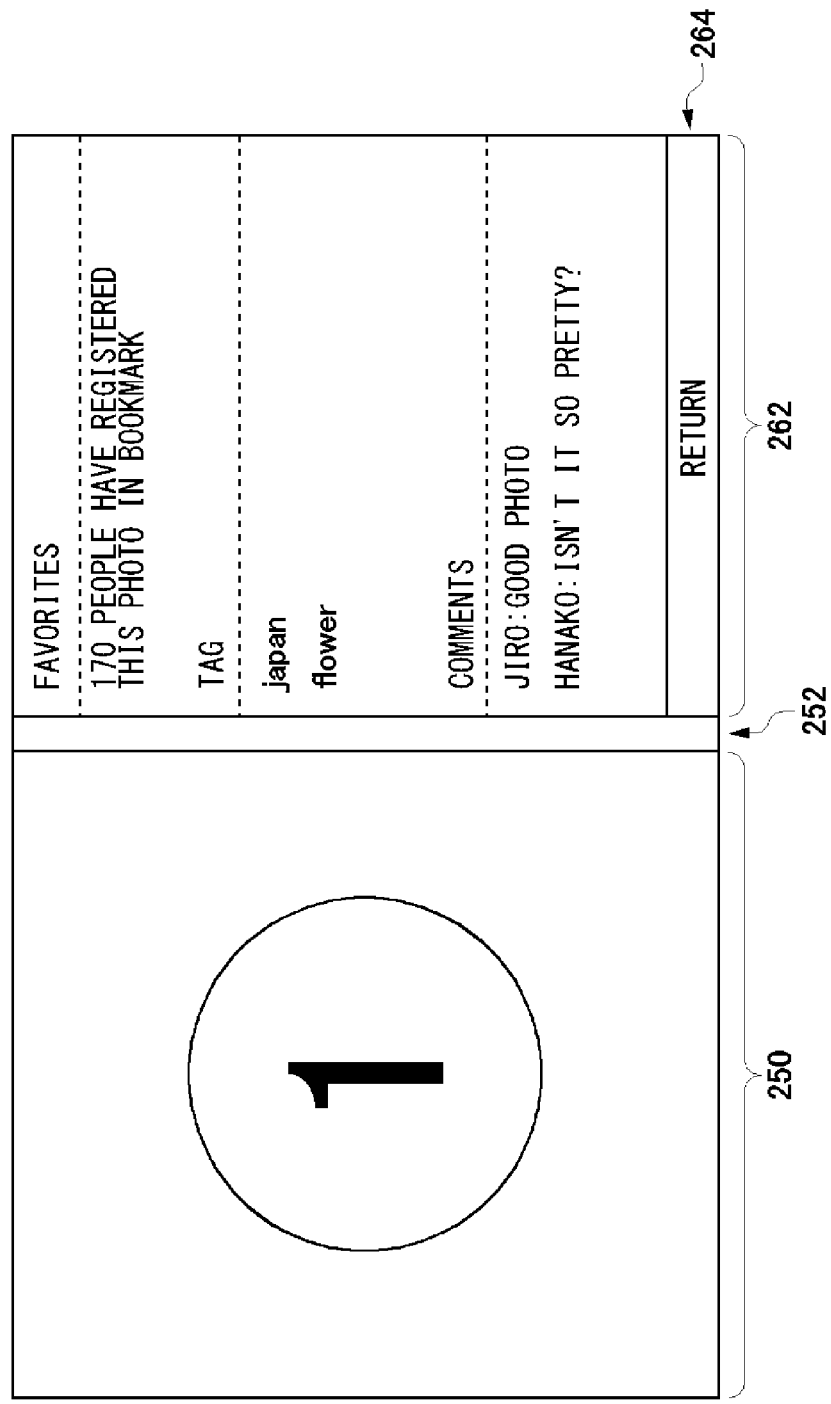
FIG. 16 illustrates a photo information screen.

A detailed description will now be given of a structure of the photo information screen display control unit 58 by referring to FIG. 15 and FIG. 16. FIG. 15 and FIG. 16 each illustrates a photo information screen 130. When a user's tap operation on a specific photo image is detected on the home screen 110 or the list screen 120, the photo information screen display control unit 58 displays the photo information screen 130 (FIG. 15) for the photo image that has been tapped.

More specifically, the photo information screen display control unit 58 displays a photo image acquired by the content acquiring unit 50 in a content region 250. Also, the photo information screen display control unit 58 displays text data associated with the photo image in an attribute region 252. The attribute region 252 includes a home icon 242 with which to allow the screen to return to the menu list screen 112, an edit icon 254 used to edit the comments or tags, a basic information area 256 that displays the name of a person who has submitted the photo image, the number of accesses and the like, a photo describing area 258 where a caption for the photo written by the contributor is displayed, and a detailed-information button 260 with which to display the detailed information concerning the photo image.

When a tap operation on the detailed-information button 260 is detected on the photo information screen 130, the photo information screen display control unit 58 displays the photo information screen 130 of FIG. 15. On the photo information screen 130 of FIG. 16, the number of users who have registered the photo image in their favorites, a tag character string set for the photo image and a comment therefor by each user, and a return button 264 are displayed in the detailed-information area 262. The photo information screen display control unit 58 displays the detailed-information area 262 in such a manner that the detailed-information area 262 is superposed on the attribute region 252. When a tap operation on the return button 264 is detected on the photo information screen 130, the photo information screen display control unit 58 displays the photo information screen 130 again.

When a tap operation on the edit icon 254 is detected on the photo information screen 130, the information input supporting unit 62 displays an input area for entering a tag and comment and a screen software keyboard in such a manner that the input area and the software keyboard are superposed on the attribute region 252. When a tap operation on a not-shown posting button is detected on the photo information screen 130, the posting processing unit 64 uploads the data for the comment and tag inputted into the input area to the photo sharing server 10 and registered them thereon.

As described above, the area presenting the basic information, the area presenting the detailed information on the photo image, and the information input area for the photo image are each switched to a region, different from the content region 250, on the photo information screen 130 and displayed thereon. This allows to present the information on the photo image and support the entry of information even in the mobile information device, where the size of the display device 68 is subject to limitation, without interfering with the viewing of the photo image by the user An operation implementing the above-described structure is as follows. As a photo viewing application is started in the mobile game device 12, the content acquiring unit 50 acquires photos which are to be displayed in the respective category areas 200 in the menu list screen 112. Then the home screen display control unit 54 displays the menu list screen 112 including a plurality of category areas 200. When the open icon 214 is tapped in any one of the category areas 200, the home screen display control unit 54 displays the individual menu screen 114 of a category associated with the tapped icon.

As the a photo list icon 210 is tapped on the menu list screen 112 or the individual menu screen 114, the content acquiring unit 50 acquires a user's photo list from the photo sharing server 10. The user screen display control unit 56 displays the user screen 122 whose content is the photo list. When a tap operation on a specific content specifying icon 246 is detected on the user screen 122, the user screen display control unit 56 switches the display content of the user screen 122 to the content associated with the tapped icon.

When a trace operation over a plurality of content specifying icons 246 is detected on the user screen 122, the user screen display control unit 56 sequentially switches the information on a selected icon in the operation guide while maintaining the display contents of the content region 230 and the operation region 240 on the user screen 122 without changing the display contents thereof. When a release operation is detected after the trace operation, the user screen display control unit 56 switches the display contents of the content region 230 and the operation region 240 to the content associated with an icon located in the position where the release operation took place.

When a tap operation on a specific photo image is detected on the home screen 110 or the list screen 120, the photo information screen display control unit 58 displays the photo information screen 130 in such a manner that the photo image tapped and the basic information concerning the photo are arranged side by side. As detailed information is required in the photo information screen 130, the photo information screen display control unit 58 displays the detailed information in such a manner that the detailed information is superposed on the basic information concerning the photo. When a photo image is tapped on the photo information screen 130, the full-screen display control unit 60 displays one photo image, which has been tapped, full-screen on the display device 68.

The present invention has been described based upon illustrative exemplary embodiments. The above-described exemplary embodiments are intended to be illustrative only and it will be obvious to those skilled in the art that various modifications to the combination of constituting elements and processes could be developed and that such modifications are also within the scope of the present invention. Some examples of such modifications are described below.

For example, when a trace operation on a content specifying icon 246 is detected, the release of the user's finger from the touch panel 69 indicates the end of the trace operation and is detected accordingly in the above-described embodiments. In a modification, however, the end of the trace operation may be detected when a predetermined operation different from the operation so far is done. For example, if a touch operation (i.e., long touch operation in this case) that continues for a predetermined time (e.g., 1 second or the like) or longer is detected on an icon located in the position where the trace operation ends, this touch operation may be detected as the termination of the trace operation. Also, if a slide operation toward a direction different from the direction where the icons are arranged (e.g., a downward slide operation) is detected on an icon located in the position where the trace operation ends, this operation may be detected as the termination of the trace operation.

Though not mentioned in the above embodiments, the pop-up display control unit 164 may display at least part of the operation guide half-translucently. For example, the icon explanatory screen is set to have a predetermined permeability using a known image processing technique such as alpha blending. Note that an object, which is to be displayed half-translucently, may be the emphasis region 306 only. Note also that the object to be displayed half translucently may be the left-hand icon explanatory data 302 and the right-hand icon explanatory data 304 only.

In the above-described embodiments, in addition to the selected icon explanatory data 300, the pop-up display control unit 164 displays the left-hand icon explanatory data 302 and the right-hand icon explanatory data 304 as the operation guide. In a modification, the pop-up display control unit 164 displays the selected icon explanatory data 300 only as the operation guide. In this case, the pop-up display control unit 164 may cause a caption for a sequentially selected icon by a trace operation is slid sequentially into the emphasis region 306 from either side of the user screen 122 in a sliding direction corresponding to the tracing direction. Similarly, a caption for an icon whose selection has been canceled by a trace operation is slid sequentially out of the emphasis region 306 of the user screen 122 so as to be off-screen in a sliding direction corresponding to the tracing direction.

In the above-described embodiments, when a touch operation on a content specifying icon 246 is detected, the pop-up display control unit 164 displays an operation guide including the selected icon explanatory data 300. In a modification, if a touch operation (i.e., long touch operation in this case), on an icon, which continues for a predetermined time (e.g., 2 seconds) or longer is detected, a further detailed caption for this icon may be obtained from the icon information storage unit 42 and display the further detailed caption near the selected icon explanatory data 300.

In the above-described embodiments, the touch panel 69 detects contact by a finger of the user, and the operation detector 46 detects an operation by the user based on the detected contact. In a modification, if a finger of the user is not in contact with the touch panel 69 but it is detected by the touch panel 69 that the finger thereof is located in close proximity to the touch panel 69, namely within a predetermined distance, the touch panel 69 may send information indicating the operation by the user to the operation detector 46 and then the operation detector 46 may detect the touch operation by the user according to the information. Also, if it is detected by the touch panel 69 that the position of the finger changes from "within the predetermined distance" to "the predetermined distance or above", the touch panel 69 may send the information to the operation detector 46 and then the operation detector 46 may detect the release operation by the user according to the information.

Further, the touch panel 69 may be operated by a medium other than the finger of the user. Such a medium may be a stylus pen, for instance.

Further, in above-described embodiments, the display contents of the content region 230, the screen explanatory region 243 and the emphasis region 306 of the user screen 122 are switched by combining the slide-out of a switching source content and the slide-in of a switching destination content. In a modification, the display contents thereof may be switched by either the slide-out of a switching source content or the slide-in of a switching destination content.

For example, if the display contents thereof are to be switched by the slide-out thereof only, a display of switching source data may be switched to a display of switching destination data in such manner that the switching destination data is set behind the switching source data (namely it is set as a background) and then the switching source data is slid out. In other words, the display content on the screen may be updated in such a manner that the switching source data overlapped onto the switching destination data is removed gradually. If the display contents thereof are to be switched by the slide-in thereof only, a display of switching source data may be switched to a display of switching destination data in such manner that the switching destination data is slid in and overlapped onto the switching source data. In other words, the display content on the screen may be updated in such a manner that the switching destination data is gradually overlapped onto the switching source data.

Further, in above-described embodiments, in the content region 230 and the screen explanatory region 243, the switching source data corresponding to a previously selected icon is slid out, and the switching destination data corresponding to a newly selected icon is slid in. In a modification, when the display contents of the content region 230 and the screen explanatory region 243 are to be updated, data corresponding to at least one icon (called "specific icon" here) located between the previously selected icon and the newly selected icon in the operation region 240 are scrolled and displayed together with an electronic content associated with the specific icon and a caption for the specific icon. In other words, the switching source data corresponding to the previously selected icon, the data corresponding to the specific icon, the switching destination data corresponding to the newly selected icon are sequentially switched and displayed. For example, the switching source data associated with the previously selected icon is slid out and the data associated with the specific icon is slid in. Then the data associated with the specific icon is slid out and the switching destination data associated with the newly selected icon is slid in.

Similar operation is applicable to displaying the operation guide when a tap operation on a content specifying icon 246 is done. For example, when a tap operation on a content specifying icon 246 is detected, the pop-up display control unit 164 may sequentially switch the caption for the previously selected icon, the caption for the specific icon, and the caption for the newly selected icon in the emphasis region 306 and display them therein. For example, after the caption for the previously selected icon has been displayed in the emphasis region 306, the caption for the previously selected icon may be slid out and the caption for the specific icon may be slid in. Then the caption for the specific icon may be slid out and the caption for the newly selected icon may be slid in. Finally, the caption for the newly selected icon may be displayed in the emphasis region 306 for a certain length of time.

Further, in the above-described embodiments, a description is given of an example where the photo images and the titles of the photo images are acquired from the photo sharing site and displayed. In a modification, comments attached to the photo images may be acquired in substitution for or in addition to the titles thereof.

Furthermore, a description is given of an example where the photo images are acquired from the photo sharing site and displayed. The technical ideas or concepts, underlying the present invention, which are exemplified and disclosed in the present embodiments are not limited to those examples and are applicable to a case where various types of contents are displayed and operations are performed using icons. For example, the technical ideas or concepts exemplified by the present embodiments are also applicable to a case where video content (including thumbnail images) is acquired from a video posting site and displayed. The technical ideas or concepts exemplified by the present embodiments are also applicable to a case where music content (including the cover images of music album or the like) is acquired from a music distribution site and displayed. The technical ideas or concepts exemplified by the present embodiments are also applicable to a case where electronic book content (including book cover images) is acquired from an electronic book distribution site. Acquiring the electronic content from a server on a network is not necessarily required, and the technical ideas or concepts exemplified by the present embodiments are also applicable to a case where electronic content stored in a local memory or the like of the mobile game device 12 (e.g., an electronic file of a game application or business application) is displayed.

Optional combinations of the aforementioned embodiments and modifications may also be useful as additional modes of the present invention. And it should be understood that new embodiments realized by such combinations and modifications thereof provide their own advantages.

It should be understood by those skilled in the art that the functions to be performed by the constituent features cited in the claims can also be realized by the components shown in the embodiments and modifications thereof alone or in combination.

What is claimed is:

1. A mobile information device comprising a memory storing a computer program executable by a microprocessor operating under the control of the computer program, the device comprising:
   a first display control unit configured to display data of a content item, selected by a user, in a first region of a screen;
   a second display control unit configured to adjacently arrange a plurality of icons through which the user selects the content item displayed in the first region, and configured to display the plurality of icons, at respective fixed stations, in a second region of the screen;
   an operation detector configured to detect a selection operation, performed by the user, for an icon displayed in the second region; and
   a pop-up display control unit configured to display, in a forefront manner, in a third region of the screen when the selection operation is detected, information on the selected icon and at substantially the same time information on an icon adjacent the selected icon,
   wherein the operation detector detects, as the selection operation, a drag operation by the user on the second region of the screen over the plurality of icons displayed in the second region, the drag operation being a tracing of the second region, from a first position on the second region of the screen, the first position being located over the fixed station of a first icon of the plurality of icons to a second position on the second region of the screen, the second position being located over the fixed station of a second icon of the plurality of icons, with a selection device without immediately releasing the selection device when arriving at the second position,
   wherein the pop-up display control unit sequentially switches among information on the plurality of icons selected sequentially by the drag operation so as to be displayed sequentially in the third region, and the first display control unit, concurrently with such pop-up display control unit sequentially switching, sequentially switches among content items associated respectively with such plurality of icons selected sequentially,
   wherein, when the selection device arrives at the second position, the first display control unit updates and maintains the display of the content item associated with the second of the plurality of icons, and upon completion of the updating the pop-up display control unit terminates the display of information in the third region, and
   wherein the forefront manner of display is such that the information in the third region of the screen is superimposed over the respectively associated content items displayed in the first region of the screen, such that the content items are respectively partially hidden underneath each content item's associated information in the third region of the screen during such forefront manner of display, and such that when the pop-up display terminates the display of information in the third region of the screen, hidden aspects of the content items being displayed in the first region of the screen are revealed upon such termination, and
   wherein the association of the information in the third region of the screen and the content items displayed in the first region of the screen is such that the information in the third region of the screen is more general in nature and the content items displayed in the first region of the screen is more specific.

2. A mobile information device according to claim 1, wherein the size of the first region is larger than the size of the second region, and wherein the pop-up display control unit displays information on the icon selected by the drag operation such that the information is superimposed on the content item in the first region.

3. A mobile information device according to claim 1, wherein the pop-up display control unit switches display of the information on the plurality of icons selected sequentially by the drag operation in such a manner that the respective information is sequentially moved into the third region.

4. A mobile information device according to claim 3, wherein, when the selection of a first icon is switched to the selection of a second icon during the drag operation, the information on the second icon is moved from a current display position toward the display position of the first icon.

5. A mobile information device according to claim 1, wherein, when a predetermined operation is detected for an icon located in the position where the drag operation ends, after a predetermined length of time the pop-up display controls hides the information on the icon located in the position where the drag operation ends.

6. A mobile information device according to claim 1, wherein the second display control unit displays information on a content item of the first region on the second region,
  wherein, while the information on each icon is sequentially switched and displayed in the third region by the drag operation, the switching of the information on the content item displayed in the second region is withheld, and
  wherein, when the predetermined operation is detected for the icon located in the position where the drag operation ends, the information on the content item currently displayed in the second region is switched to the information for the content item associated with the icon located in the position where the drag operation ends.

7. A mobile information device according to claim 1, wherein, when the content item displayed in the first region is to be switched from a content item associated with a first icon to a content item associated with a second icon different from the first icon, the first display control unit slides the content item associated with the second icon toward the display position of the first icon from a display position of the second icon.

8. A mobile information device according to claim 1, wherein the predetermined operation for the icon located in the position where the drag operation ends is a release operation from the screen.

9. A content display method employed by a mobile information device, the method comprising:
  displaying in a first region of a screen a content item to be selected by a user, adjacently arranging a plurality of icons through which the user selects the content item to be displayed in the first region, and displaying the plurality of icons, at respective fixed stations, in a second region of the screen;
  switching among information on the plurality of icons selected sequentially by a drag operation on the second region of the screen so as to display, in a forefront manner, sequentially on a third region of the screen when the drag operation is detected over the plurality of icons, information on a selected icon and at substantially the same time information on an icon adjacent the selected icon;
  concurrently with the sequential switching on the third region, sequentially switching among displayed content items associated respectively with such plurality of icons selected sequentially; and
  switching the content item displayed on the screen to a content item associated with an icon located in a position where the drag operation ends when a predetermined operation is detected on said icon located in the position where the drag operation ends, wherein
  the drag operation is a tracing, from a first position on the second region of the screen, the first position being located over the fixed station of a first icon of the plurality of icons to a second position on the second region of the screen, the second position being located over the fixed station of a second icon of the plurality of icons, with a selection device without immediately releasing the selection device when arriving at the second position, and wherein
  when the selection device arrives at the second position, the display of the content item associated with second of the plurality of icons is updated and maintained, and upon completion of the updating the display, in the third region, of the information on the second of the plurality of icons and the information on the icon adjacent the second of the plurality of icons is terminated, and
  wherein the forefront manner of display is such that the information in the third region of the screen is superimposed over the respectively associated content items displayed in the first region of the screen, such that the content items are respectively partially hidden underneath each content item's associated information in the third region of the screen during such forefront manner of display, and such that when the display of information in the third region of the screen is terminated, hidden aspects of the content items being displayed in the first region of the screen are revealed upon such termination, and
  wherein the association of the information in the third region of the screen and the content items displayed in the first region of the screen is such that the information in the third region of the screen is more general in nature and the content items displayed in the first region of the screen is more specific.

10. A computer program embedded in a non-transitory computer-readable medium, the program comprising:
  a display control module operative to display in a first region of a screen a content item to be selected by a user, to adjacently arrange a plurality of icons through which the user selects the content item to be displayed in the first region, and to display the plurality of icons, at respective fixed stations, in a second region of the screen;
  a first switching module operative to switch among information on the plurality of icons selected sequentially by a drag operation on the second region of the screen so as to display, in a forefront manner, sequentially on a third region of the screen when the drag operation is detected over the plurality of icons, information on a selected icon and at substantially the same time information on an icon adjacent the selected icon;
  a second switching module operative to, concurrently with the sequential switching on the third region, sequentially switch among displayed content items associated respectively with such plurality of icons selected sequentially; and
  a third switching module operative to switch the content item displayed on the screen to a content item associated with an icon located in a position where the drag operation ends when a predetermined operation is detected on said icon located in the position where the drag operation ends, wherein
  the drag operation is a tracing, from a first position on the second region of the screen, the first position being located over the fixed station of a first icon of the plurality of icons to a second position on the second region of the screen, the second position being located over the fixed station of a second icon of the plurality of icons, with a selection device without immediately releasing the selection device when arriving at the second position, and wherein when the selection device arrives at the second position, the display of the content item associated with second of the plurality of icons is updated and maintained, and upon completion of the updating the display, in the third region, of the information on the second of the plurality of icons and the information on the icon adjacent the second of the plurality of icons is terminated, and wherein the forefront manner of display is such that the information in the third region of the screen is superimposed over the respectively associated content items displayed in the first region of the screen, such that the content items are respectively partially hidden underneath each content item's associated information in the third region of the screen during such forefront manner of display, and such that when the display of information in the third region of the screen is terminated, hidden aspects of the content items being displayed in the first region of the screen are revealed upon such termination, and wherein the association of the information in the third region of the screen and the content items displayed in the first region of the screen is such that the information in the third region of the screen is more general in nature and the content items displayed in the first region of the screen is more specific.

\* \* \* \* \*